US007889101B2

(12) United States Patent
Yokota

(10) Patent No.: US 7,889,101 B2
(45) Date of Patent: Feb. 15, 2011

(54) METHOD AND APPARATUS FOR GENERATING LOCATION BASED REMINDER MESSAGE FOR NAVIGATION SYSTEM

(75) Inventor: Tatsuo Yokota, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 226 days.

(21) Appl. No.: 12/082,711

(22) Filed: Apr. 14, 2008

(65) Prior Publication Data

US 2010/0026526 A1 Feb. 4, 2010

(51) Int. Cl.
*G01C 21/00* (2006.01)
*G08G 1/123* (2006.01)

(52) U.S. Cl. .............................. 340/995.19; 340/995.1; 340/995.14; 701/200; 701/201

(58) Field of Classification Search .............. 340/539.1, 340/539.13, 995.1, 995.14, 995.19; 701/200–216
See application file for complete search history.

(56) References Cited

U.S. PATENT DOCUMENTS 6,266,612 B1 * 7/2001 Dussell et al. .............. 701/207
6,587,782 B1 * 7/2003 Nocek et al. ................ 701/200
6,850,837 B2 * 2/2005 Paulauskas et al. ......... 701/200
6,944,539 B2 * 9/2005 Yamada et al. .............. 701/211
7,274,299 B2 * 9/2007 Osman ..................... 340/686.1
2006/0229802 A1 * 10/2006 Vertelney et al. ............ 701/200
2007/0188319 A1 * 8/2007 Upton ................... 340/539.13

FOREIGN PATENT DOCUMENTS

JP 2004-271335 9/2004
JP 2007-107938 4/2007

* cited by examiner

*Primary Examiner*—Benjamin C Lee
*Assistant Examiner*—Lam P Pham
(74) *Attorney, Agent, or Firm*—Muramatsu & Associates

(57) ABSTRACT

A method and apparatus for a navigation system for generating a reminder message by applying predefined validation rule to display and/or voice announce the reminder message associated with a particular location. The method includes the steps of creating reminder message data which include a reminder message, a primary location, a secondary location, and a validation rule; comparing a reference location with the primary location; applying the validation rule in the reminder message data to determine whether a relationship between the primary location and the reference location satisfies the condition in the validation rule; displaying the reminder message when the condition is satisfied; and conducting a route guidance operation to reach a location selected by the user.

20 Claims, 19 Drawing Sheets

METHOD AND APPARATUS FOR GENERATING LOCATION BASED REMINDER MESSAGE FOR NAVIGATION SYSTEM

FIELD OF THE INVENTION

This invention relates generally to a method and apparatus for generating a location based reminder for a navigation system, and more particularly, to a method and apparatus for generating a reminder message by applying predefined activation rules so that a reminder operation will be triggered by a relationship among a reference location, a primary location and other conditions to display and/or voice announce the reminder message associated with a particular location.

BACKGROUND OF THE INVENTION

A navigation system performs travel guidance for enabling a user to easily and quickly reach the selected destination. A typical example is a vehicle navigation system where a vehicle is equipped with a GPS (Global Positioning System) navigation function to guide a driver to a destination through a calculated route. Such a navigation system detects the position of the user's vehicle, and reads out map data pertaining to an area at the current vehicle position from a data storage medium, for example, a CD-ROM, a DVD, or a hard disc, etc. of the navigation system, or from a remote data server.

Typically, during a map mode, the navigation system displays a map image on a monitor screen while superimposing thereon a mark representing the current location of the user's vehicle. During a route guidance mode, the navigation system further displays a calculated route to the destination on the map image in a highlighted manner. At an intersection, if a turn is necessary, the navigation system notifies the user which direction to turn at the intersection such as by displaying an arrow image and generating voice instructions.

Today, such navigation systems installed in vehicles have been widely used for route guidance because GPS (Global Positioning System) signals from GPS satellites are available to anyone for detecting an absolute position. Portable navigation devices have also been widely used because of their portability, improved memory capacity, relatively low price, etc. With use of the navigation function incorporated in such a navigation system, it is desirable to achieve new and useful functionalities for expanding applications of the navigation system.

SUMMARY OF THE INVENTION

It is, therefore, an object of the present invention to provide a method and apparatus for a navigation system to generate a reminder message based on a particular location associated with a user of the navigation system, etc.

It is another object of the present invention to provide a method and apparatus for a navigation system to generate a reminder message by applying predefined activation rules so that the reminder operation will be triggered by the relationship among various conditions.

It is a further object of the present invention to provide a method and apparatus for a navigation system to generate a reminder message which is displayed and/or voice announced where the reminder message associated with a particular location.

It is a further object of the present invention to provide a method and apparatus for a navigation system to generate a reminder message which is displayed and/or voice announced where the reminder operation will be triggered by the relationship among a reference location, a primary location, an effective time, etc.

It is a further object of the present invention to provide a method and apparatus for a navigation system to generate a reminder message based on the reminder message data which is created directly by operating the navigation system or indirectly via a personal computer and transferred to the navigation system.

One aspect of the present invention is a method for generating a location based reminder by a navigation system. The method includes the steps of: creating reminder message data which include a reminder message, a primary location, a secondary location, and a validation rule where the primary location is a location associated with the reminder message, a secondary location is a location where a user conducts an activity defined by the reminder message, and the validation rule defines condition for generating the reminder message; comparing a reference location with the primary location where the reference location is a destination for a route guidance operation of the navigation system or a current vehicle and/or user position; applying the validation rule in the reminder message data to determine whether a relationship between the primary location and the reference location satisfies the condition in the validation rule for generating the reminder message; displaying the reminder message associated with the primary location when the condition defined in the validation rule is satisfied where the display includes one or more candidate secondary locations; and conducting a route guidance operation to reach a location selected by the user.

The method of the present invention further includes a step of accepting a user's selection of one of the candidate secondary locations for the route guidance operation.

In the method of the present invention, the reminder message data further include data related to an effective time which specifies a time range or a time limit for generating the reminder message which will be evaluated in combination with the validation rule. The method of the present invention further includes a step of determining whether the effective time has been met before displaying the reminder message associated with the primary location.

In the method of the present invention, when the secondary location in the reminder message data defines a POI type, and the navigation system searches and displays the candidate secondary locations belonging to the POI type when displaying the reminder message. Then, the candidate secondary locations belonging to the POI type will be displayed in an order of distance from the reference location or in an order of alphabet when displaying the reminder message.

In the method of the present invention, the reminder message data include two or more different effective times for generating the reminder message and two or more different conditions in the validation rule for triggering a reminder operation so that the reminder message will be generated depending on the different times and conditions.

In the method of the present invention, the step of conducting a route guidance operation includes a step of selecting a candidate secondary location as a destination (final destination) or a waypoint (intermediate destination) for the route guidance operation by the navigation system.

Further, in the present invention, the step of creating the reminder message data includes a step of directly inputting the reminder message data by operating the navigation system or indirectly inputting the reminder message data by a personal computer and transferring the reminder message data to the navigation system.

Another aspect of the present invention is an apparatus for a navigation system which generates a reminder message based on a location associated with a navigation system by applying predefined validation rules so that the reminder operation will be triggered by the relationship among the reference location, primary location and other conditions to display and/or voice announce the reminder message associated with a particular location. The apparatus of the present invention achieves this effects by implementing the various steps of the method of the present invention described above. The navigation system stores the reminder message data which is created directly by operating the navigation system or indirectly via a personal computer and transferred to the navigation system so that the reminder message will be generated when the vehicle reaches a location associated with the message.

According to the present invention, the navigation system stores the reminder message data for generating the location based reminder by the navigation system. The reminder message data include the message content, primary location, secondary location, effective time, validation rule, etc., created by the user or persons or organizations associated with the user. When the condition associated with the primary location such as a current vehicle position is satisfied in applying the validation rule, the navigation system generates the reminder message on the display which is typically accompanied by a voice message as well.

The reminder message includes one or more secondary location at which the user is able to conduct the activity defined by the reminder message. The user is able to set the secondary location as one of the destination for the route guidance operation by the navigation system so that the user can reach the secondary location correctly and quickly. The reminder message data may be set directly by a navigation system or indirectly via various other external devices and transferred to the navigation system via wired or wireless communication, or inserting a memory card, etc. By the process and configurations described above, the present invention is able to provide useful and enjoyable functions to the navigation system.

DETAILED DESCRIPTION OF THE PREFERRED EMBODIMENT

Figure 1A:
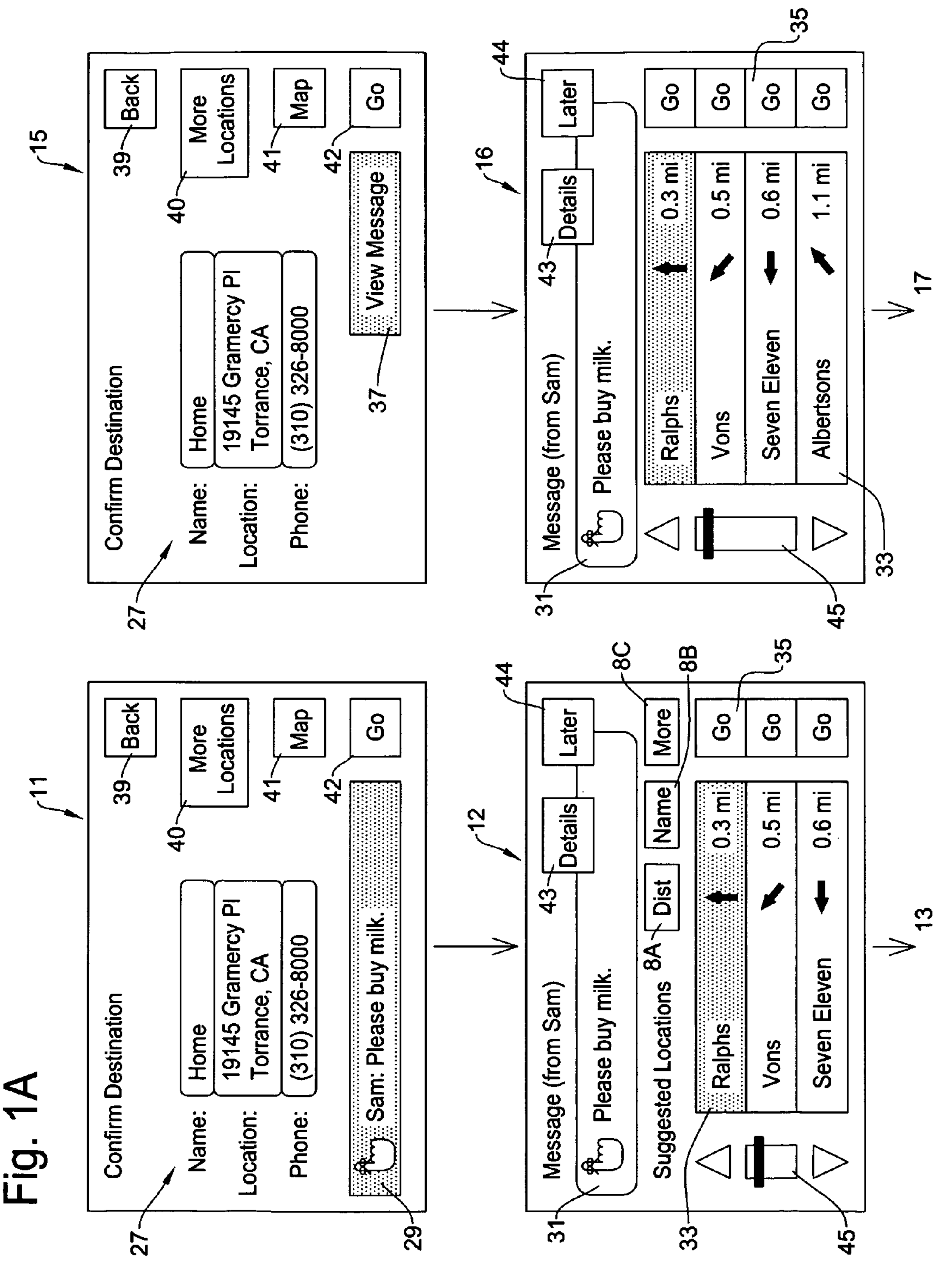
FIGS. 1A to 1D are display examples implementing the location based reminder of the present invention for a navigation system where a reference location for the reminder activation is a route guidance destination.

The method and apparatus of the present invention for producing a location based reminder with use of a navigation system is described in detail with reference to the accompanying drawings. The present invention is designed to provide the process and structure for flexibly and conveniently displaying and announcing a reminder message based on a particular location and other condition with use of the positioning capability of navigation system. A location, such as a current location of a user or a location of the destination, acts as one of the triggering events to generate a message, i.e., a location based reminder. For example, when a user comes close to a particular laundry, the navigation system will show a message which reminds the user to pick up laundry. In another example, when the user inputs a destination for a route guidance operation, the navigation system will show a reminder message that is related to the specified destination.

Thus, the method and apparatus of the present invention is able to provide a flexible, convenient and easy way to notify the user a certain errand, job, meeting, etc. scheduled by the user or other persons or organization related to the user through the navigation system. Information for producing the location based reminder can be directly input to the navigation system or indirectly through a communication means, or inserting a memory card, etc. It should be noted that the present invention is described mainly for the case where the method and apparatus is applied to a vehicle navigation system, however, the method and apparatus under the present invention can be implemented to other devices, such as portable devices or personal computers, etc.

The navigation system applies activation (validation) rules for triggering an operation for generating a reminder message at an appropriate time at an appropriate location. The reminder message can be activated based on a specified time range, and a particular location, for example, a street address, an intersection, a POI name, a POI type, a phone number, an address book entry, a latitude/longitude point, etc. It may also be activated by a particular area, such as a city name, a scenic byway, a specified radial distance from a location, etc. It may further be activated by a range of road segments, such as along a street, a collection of street names, a group of nearby freeway ramps, etc. The reminder message and associated parameters noted above may be created by the user, for example, in a manner of data structure and components shown in FIG. 5 as will be explained later.

When the condition associated with particular locations, time, etc., is satisfied, the reminder message is displayed and voice announced along with suggested locations. Such a reminder message will be displayed on the screen with a text format as well as accompanying an icon indicating a type of message. As noted above, the reminder message will also be made by a voice announcement so that the user does not have to see the screen of the navigation system, which promotes the safe driving when the user is driving a vehicle.

FIGS. 1A to 1D are schematic diagrams showing display examples in an embodiment under the present invention implementing the location based reminder function. The same reference numbers are used for the same components and functions throughout the display examples in FIGS. 1A to 1D. Referring to FIG. 1A, a display example 11 shows the condition where the user has specified a destination. In this example, a destination information area 27 on the screen shows that the destination is a "Home" of the user and its address and phone numbers are displayed.

At the lower portion of the display example 11, a reminder message window 29 showing a reminder message "Sam: Please buy milk") is displayed. This message is displayed because the navigation system has determined that the condition for activating the reminder has been met. Such a condition is determined by evaluating the information preset or otherwise input in the navigation system such as a time range and the location information derived from the map database of the navigation system.

More specifically, message contents, a primary location, a secondary location, an effective time, and other information created in the reminder message data (FIG. 5) are evaluated in combination with a current time, a current location, a destination location, etc. The details of such reminder message data will be described later with reference to FIG. 5. Typically, a current location or a destination location is used as a reference location to be compared with the primary (assigned) or secondary (suggested) location in the reminder message data.

In the display example 11 of FIG. 1A, a "Back" button 39 is provided to return to the previous menu or function. A "More Locations" button 40 is provided to find further locations as shown in a display example 26 shown in FIG. 1D. A "Map" button 41 is provided in the display example 11 to display an map image around a suggested location (ex. supermarket "Ralph" for buying milk) as shown in a display example 18 in FIG. 1B. A "Go" button 42 in the display example 11 is provided to proceed to the route calculation operation as shown in a display example 14 in FIG. 1B, thereby creating a calculated route to the destination, which will be a candidate location related to the location based reminder for accomplishing an activity of the user (ex. buy milk) defined in the reminder message.

When the user activates the reminder message window 29 indicating "Sam: Please buy milk", the navigation will show the detailed information concerning the reminder as shown in a display example 12 in FIG. 1A. The display example 12 shows a suggested (secondary) location list 33 that is associated with the reminder message. Typically, the suggested locations are candidate places that have specified by the user, etc. when establishing the reminder message data or searched by the navigation system based on the category or type of POI set by the user when establishing the reminder message data.

In this example, the list 33 of the suggested locations includes supermarkets and drug stores to buy milk indicated by the reminder message. Such suggested locations are listed, for example, in the order of distance which may be measured from the current vehicle position or from the specified destination (in the example of display example 11, "Home"). The user may scroll the list to see more suggested locations by pressing the scroll button 45.

The order of listing the suggested locations in the list 33 will be specified by pressing the assigned keys, such as a "Dist" button 8A or a "Name" button 8B. When the "Dist" button 8A is pressed, the navigation system will arrange the entries in the suggested locations list 33 by the order of distance. When the "Name" button 8B is pressed, the navigation system will arrange the entries in the suggested locations list 33 by an alphabetical order.

Figure 1B:
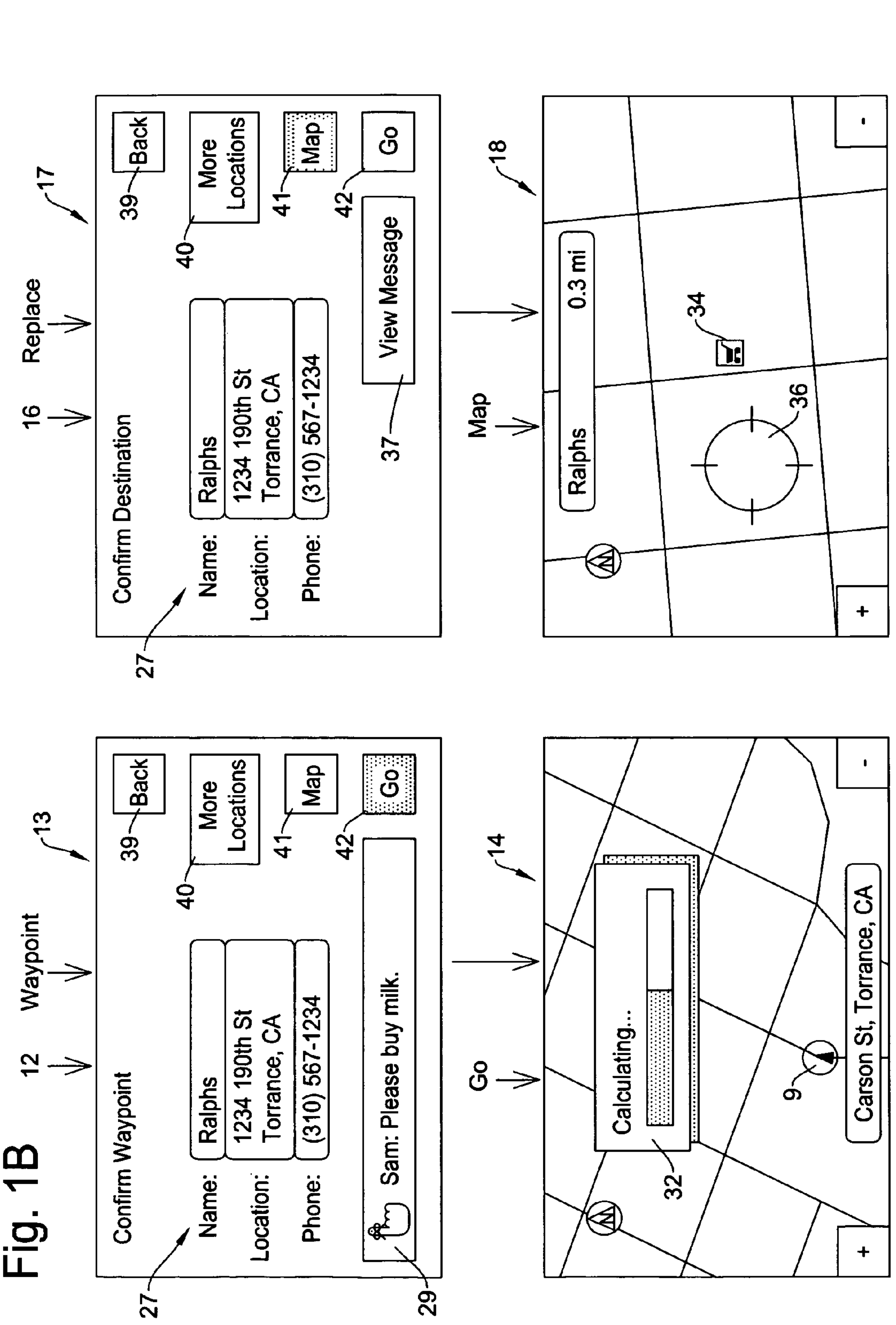
Figure 1C:
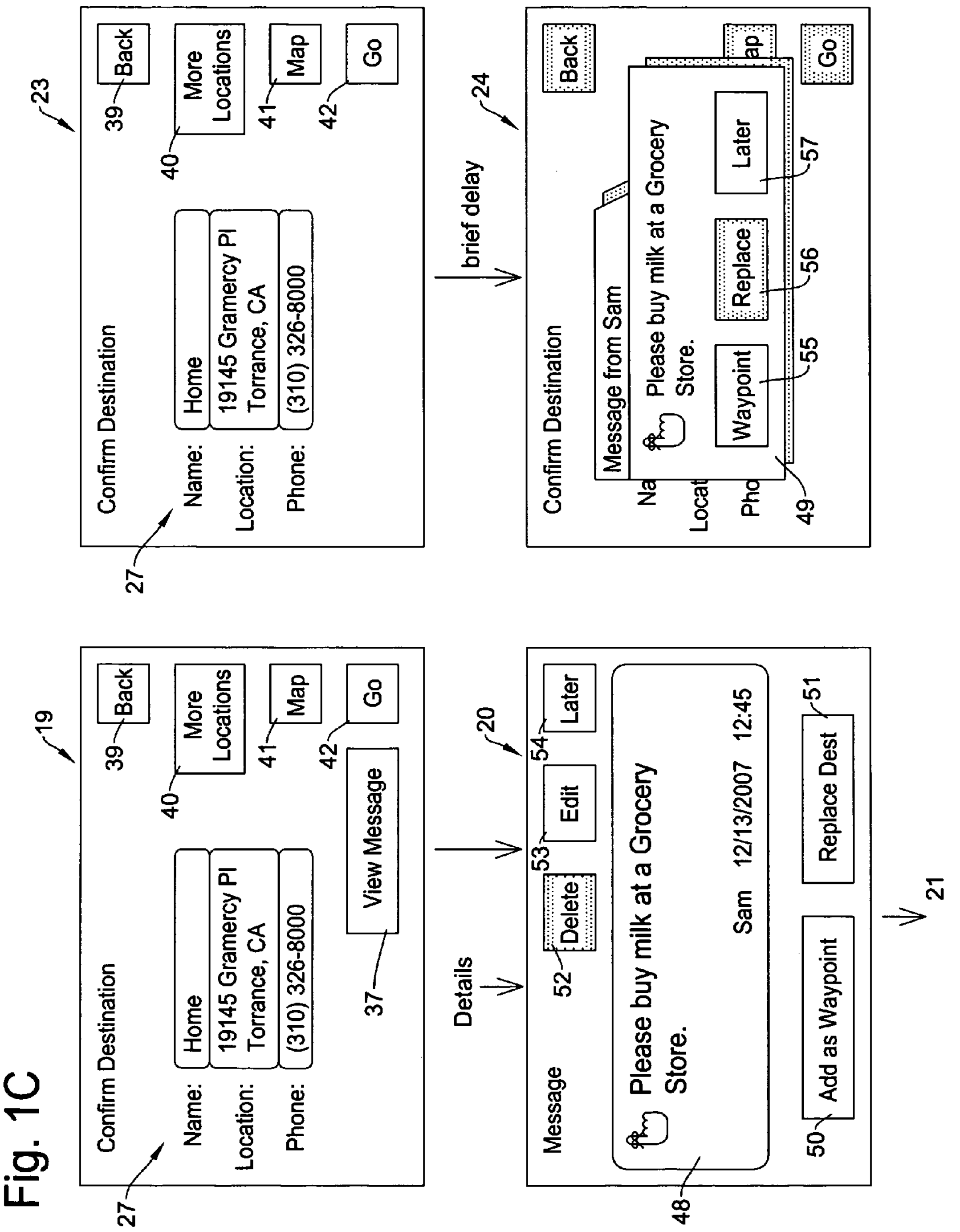
Figure 1D:
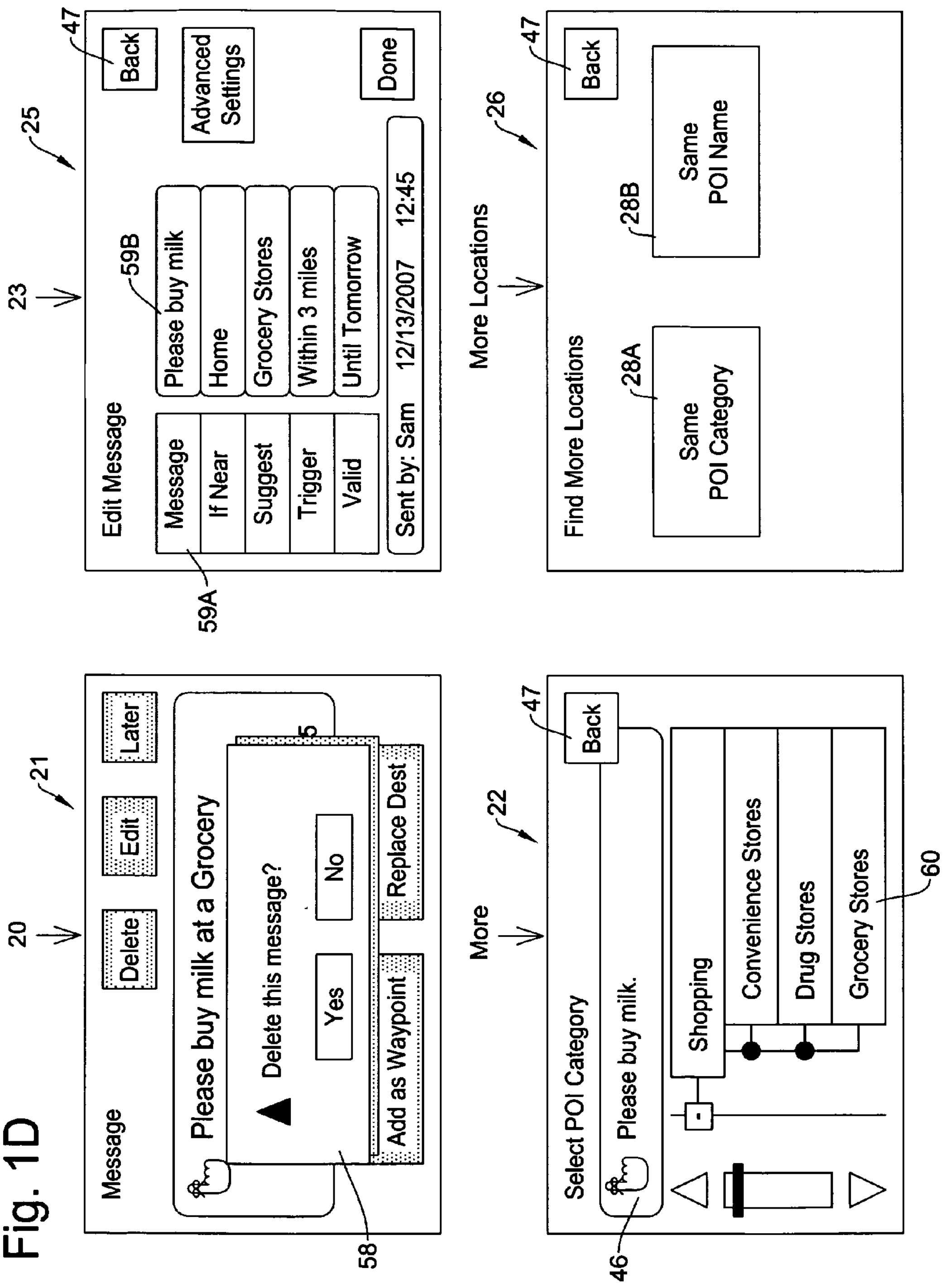

When the user presses a "More" button 8C, a display example 22 shown in FIG. 1D will be displayed, which allows the user to modify, add or delete a POI category for searching further locations for the user to buy milk. For instance, the user may limit the POI category to only grocery store, or the user may add a category of convenience store as suggested locations. By selecting or canceling the categories in the POI category list 60 on the display example 22, the user is able to change the base data as to which category is to be included or excluded for searching the suggested locations. By pressing a "Back" button 47 on the display example 22, the navigation system will return to the display example 12 in FIG. 1A.

By pressing a "Details" button 43 on the display example 12, the navigation system will show a display example 20 in FIG. 1C. The display example 20 provides more detailed information of the reminder message in a message window 48 and additional function keys or buttons for further functions. In FIG. 1A, by pressing a "Later" button 14 on the display example 12, the navigation system will return to the display example 11.

In the display example 12 of FIG. 1A, when the user presses a "Go" button 35 next to an entry of the suggested location list 33, the navigation system will show a display example 13 or 17 shown in FIG. 1B. The difference between the display example 13 and 17 is in a manner of displaying the reminder message and a manner of selecting a suggested location as a destination or a waypoint. In the display example 13, the user will see the confirmation display that shows the name, address and telephone number of the selected location, a waypoint to accomplish the activity (ex. buy milk) indicated by the reminder message. It should be noted that the "Go" 42 button in the previous step (display example 11 in FIG. 1A) will set the selected location as the destination (final destination) as opposed to a waypoint (intermediate destination).

Thus, in the display example 12 in FIG. 1A, the "Go" button 35 located next to each entry of the suggested location list 33 is to confirm and establish the route to the selected location as a waypoint. The waypoint here refers to an additional location that is a stop-over (intermediate destination) before reaching the final destination. Within the context of the present invention, both a waypoint (intermediate destination) and a destination (final destination) may also be collectively referred to as a destination.

In the display example 13 or display example 17 in FIG. 1B, rather than confirming the waypoint or destination on the screen, the user may want to find other locations. In such a situation, the user presses the "More Location" button 40 on the screen so that the navigation system shows a display example 26 in FIG. 1D. In the display example 26, the navigation system provides menu buttons on the screen to assist the user to find more locations related to accomplish the activity specified by the reminder message.

More specifically, in the display example 26, a "Same POI Category" button 61A and a "Same POI Name" button 61B are displayed on the screen. The user may search for more locations in the same POI category as that of the current POI (shown in the display example 13 or 17) by pressing the "Same POI Category" button 61A. Alternatively, the user may search for more locations in the same POI name as that of the current POI (shown in the display example 13 or 17) by pressing the "Same POI Name" button 61B.

Referring back to the display example 13 in FIG. 1B, when the user presses the "Go" button 42 on the display 13, the navigation system will start calculating the route as shown in a display example 14 in FIG. 1B. In the display example 14, a calculation indicator 32 will be illustrated to show that it is under the process of calculating a route to the selected waypoint. When the "Map" button 41 on the display example 13 is pressed, the navigation system will show a display example 18 which provides a map image and a location of the waypoint on the map image. In the display example 18 in FIG. 1B, a location icon 34 is shown on the map image to indicate the location of the selected waypoint as well as a cursor 36 for pointing a desired location on the map image.

Referring to FIG. 1A again, a display example 15 is an alternative screen for confirming the destination similar to the display example 11. A major difference between the display example 15 and the display example 11 is that the reminder message window 29 in the display example 11 is not included in the display example 15. Instead, the display example 15 includes a "View Message" button 37 so that the user is able to check the reminder message and associated information by operating the "View Message" button 37.

Thus, when the user presses the "View Message" button 37, the navigation system will show a display example 16, which provides the content of the reminder message and a list 33 of suggested locations similar to the display example 12. In this example 16, place names selling the milk are listed which are arranged in the order of distance which may be measured from the current vehicle position or from the primary destination. When the user presses the "More Locations" button 40 on the display example 15, the navigation system will show the display example 26 in FIG. 1D to find more locations as described above.

When the user presses the "Map" button 41 in the display example 15, the navigation system will show the display example 18 in FIG. 1B that provides the map image around the suggested location "Ralphs" as noted above. When the user presses the "Go" button 42 in the display example 15, the navigation system will show the display example 14 in FIG. 1B for confirmation of the destination. As noted above, in this step, the navigation system will calculate the route to the destination. i.e., "Home" in this case, for the route guidance operation.

In the display example 16, the user may scroll the list 33 to see more suggested locations for achieving the activity specified in the reminder message by pressing the scroll key 45. When the user presses the "Details" button 43, the navigation system will show a display example 20 shown in FIG. 1C which shows more detail of the content of the reminder message. By pressing the "Later" button 44, the screen returns to the display example 15.

When the user presses the "Go" button 35 next to each entry of the suggested locations list 33 in the display example 16, the navigation system will go to the display example 17 shown in FIG. 1B, which is to confirm the destination as described above. In the display example 17 shown in FIG. 1B, the user will replace the original destination with the selected suggested location "Ralphs" as opposed to adding a new destination as a waypoint. When the user presses the "More Location" button 40 on the display example 17, the navigation system will show the display example 26 in FIG. 1D, wherein the user is able to find more locations for the selected message.

Referring back to the display example 16 in FIG. 1A, when one of the suggested locations is selected by the "Go" button 35, the navigation system will set the selected location as a waypoint and shows the display example 13 in FIG. 1B or as a destination and shows the display example 17 in FIG. 1B both of which have been described above. The user may press the "More Locations" button 40 on the display example 13 or 17 to proceed to the display example 26 in FIG. 1D that has been described above.

When the user presses the "Go" button 42 on the display example 13 or 17 in FIG. 1B, the navigation system will start calculating the route as shown in the display example 14 in FIG. 1B. When the "Map" button 41 on the display example 13 or 17 is pressed, the navigation system will show the display example 18 in FIG. 1C that shows the selected location "Ralphs" on the map image. As noted above, in the display example 18, the icon 34 is displayed on the map image to indicate the location of the selected suggested location and the cursor 36 for pointing a desired location on the map image.

Referring now to a display example 19 of FIG. 1C, which is basically the same as the display example 15 in FIG. 1A for confirming the destination. However, the next screen when pressing the "View Message" button 37 on the display example 19 is different from that of the counterpart of the display example 15. Namely, when the user presses the "View Message" button 37, the navigation system will show a display example 20 which includes, in addition to the message contents, menu keys different from that in the display example 16 of FIG. 1A.

Namely, the display example 20 includes an "Edit" button 53, a "Delete" 52 key, a "Later" key 54, an "Add as Waypoint" button 50, and a "Replace Destination" button 51. The user may press the "Edit" button 53 to modify or edit the reminder message data through a screen shown by a display example 25 in FIG. 1D to edit message. In the display example 25, the user is able to select the reminder data by selecting message component buttons 59B that are provided next to corresponding message component indicators 59A and rewriting the selected message component.

Referring back to the display example 20, by pressing the "Delete" key 52, the navigation system will show a display example 21 in FIG. 1D which allows the user to delete the reminder message. In the display example 21, a window 58 that prompts the user to select either delete the message or not will be shown. In the display example 20 of FIG. 1D, the user may press the "Later" button 54 to instruct the navigation system to go back to the previous screen, i,e., the display example 19.

In the display example 20 of FIG. 1C, a reminder message window 48 is displayed at the center of the screen showing the reminder message and its icon. In the display example 20, the user may press the "Add as Waypoint" button 50 to add a suggested location as the waypoint, in which case the screen will be changed to the display example 13 in FIG. 1B to confirm the waypoint (intermediate destination). Further, in the display example 20 of FIG. 1C, the user may also press the "Replace Dest" button 51 to replace the original destination with the suggested location, in which case, the screen will be changed to the display example 17 in FIG. 1B.

A display example 23 of FIG. 1C is another example of confirmation screen which is similar to that of the display examples 17 and 19 but is more simplified with limited function keys. Namely, the display example 23 is simplified because it does not have the "View Message" button 37 shown in the display examples 17 and 19. With respect to the same function keys and buttons, the display example 23 works similarly to that of the display examples 11, 15, 17 and 19 described above.

In the display example 23, even though there is not the "View Message" button 37 shown in the display examples 17 and 19, after a brief delay, the navigation system will automatically proceed to show the message contents by a display example 24. The display example 24 may also be displayed when the user presses the "Go" button 42 through the display example 23. The display example 24 includes a message window 49 in which a "Waypoint" button 55, a "Replace" button 56 and a "Later" button 57 are respectively displayed in addition to the message contents.

When the user selects the "Waypoint" button 55, the navigation system will show the display example 13 in FIG. 1B to set a suggested location as a waypoint (tentative or intermediate destination) for achieving the activity stated in the reminder message. When the user selects the "Replace" button 56, the navigation system will show the display example 17 in FIG. 1B to set the suggested location as the destination. When the user selects the "Later" button 57, the navigation system will return to the prior screen, i.e., the display example 23.

Various methods may be used to record the reminder message data in the navigation system. One method for such message recordation is to use an external storage device that can be connected to the navigation system either by inserting the storage device or through a wired or wireless communication. For instance, a USB memory, a memory card, a cellar phone with bluetooth connection, etc, can be used as an external storage device that transfers the reminder message data to the navigation system.

A web page may be made available to create and send the reminder message data to a particular navigation system, or to revise or cancel the existing reminder message data in the navigation system. Such a web page may be accessible by a personal computer or a portable device such as a cellular phone or a PDA. The user may directly input the reminder message data in the navigation system itself through the keyboard formed of the navigation system.

Figure 2A:
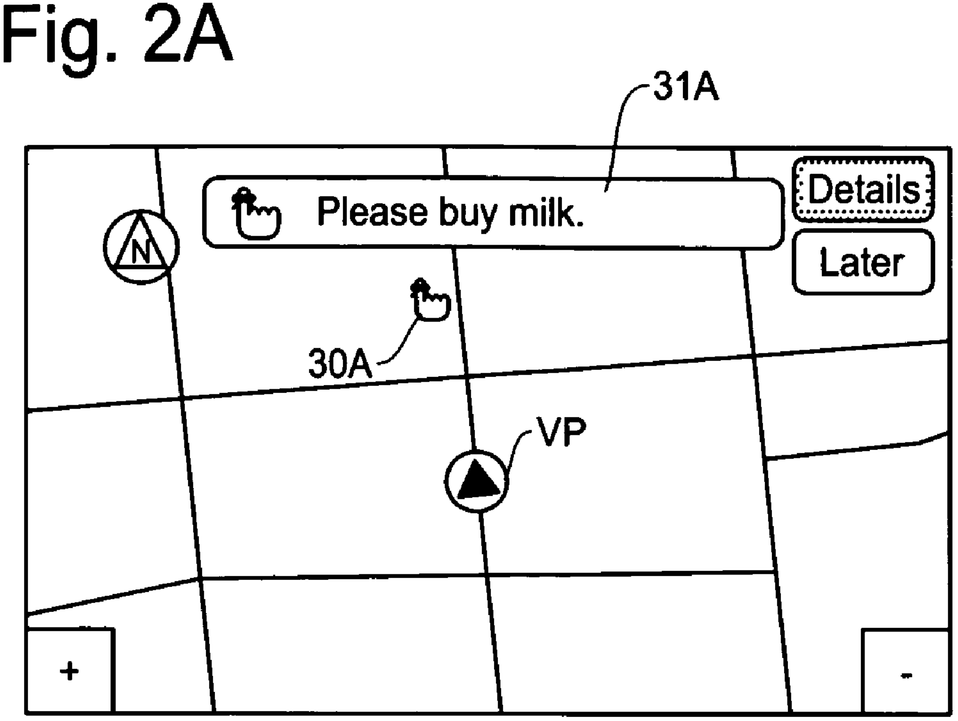
FIGS. 2A and 2B are display examples of the location based reminder implemented in a navigation system under the present invention where a reference location for the reminder activation is a current vehicle position.
Figure 2B:
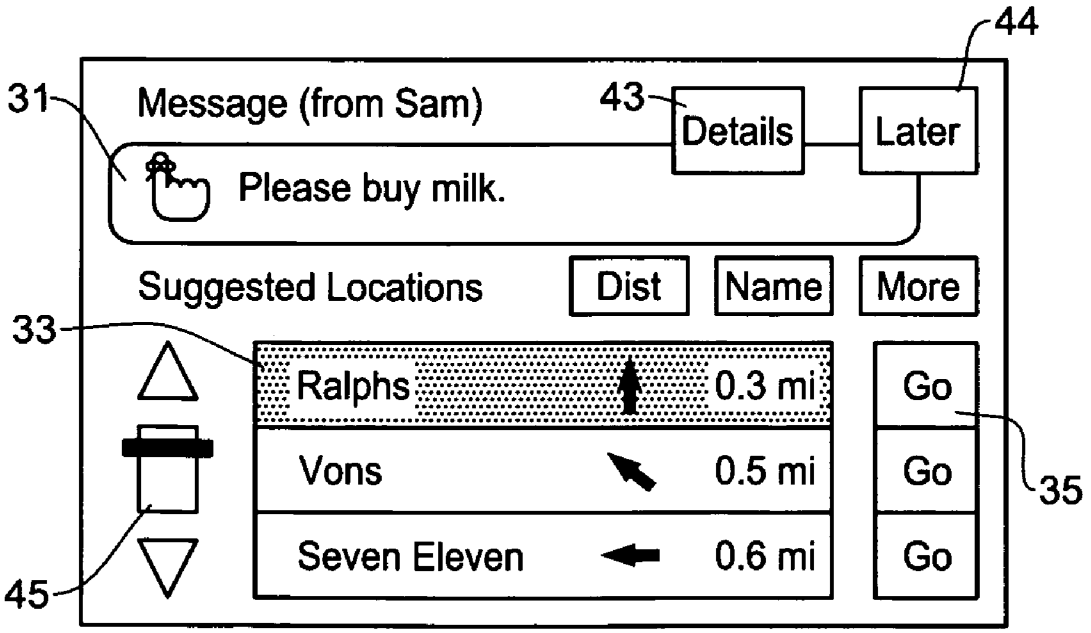

In the display examples described with reference to FIGS. 1A to 1D, the location based reminder is issued based on the destination specified by the user as a reference location that triggers the associated reminder operation. FIG. 2A and FIG. 2B shows display example of the location based reminder under the present invention where the reference location is a current vehicle position rather than a destination. In other words, the reference location may be the current vehicle location having the navigation system or the current location of the user who has a portable navigation device, etc.

As the vehicle or user moves, the current location thereof will change which is constantly checked by the navigation system with reference to the GPS signals, gyro signals, etc. FIG. 2A shows an example of screen display where the current location becomes close enough (within a predetermined range) to the primary location and the reminder message associated with the primary location is shown on the display or otherwise reproduced. The current position is indicated by an indicator VP (vehicle position) on the map image.

In the example of FIG. 2A, the reminder message window 31A shows the message "Please buy milk" as the location related reminder. The primary location (assigned location) is shown on the map image by a primary location icon 30A which is a location such as a user's home that triggers to produce the reminder message. In this example, since the user is within a predetermined distance range from his/her home, the navigation system produces the reminder message so that the user is reminded of buying milk at a nearby supermarket, etc.

The user may press a "Details" button to show detailed information regarding the reminder message, then, the navigation system displays a screen such as shown in FIG. 2B. The display screen shown in FIG. 2B is equivalent to the display example 12 in FIG. 1A that includes a list of suggested locations for conducting the activity specified by the reminder message. As described above, the user is able to select one of the suggested locations to go there by the route guidance operation of the navigation system or the user is able to ignore the message.

The order of listing the suggested locations in the list 33 will be specified by pressing the assigned keys, such as a "Dist" button or a "Name" button. When the "Dist" button is pressed, the navigation system will arrange the entries in the suggested locations list 33 by the order of distance. When the "Name" button is pressed, the navigation system will arrange the entries in the suggested locations list 33 by an alphabetical order.

Figure 3A:
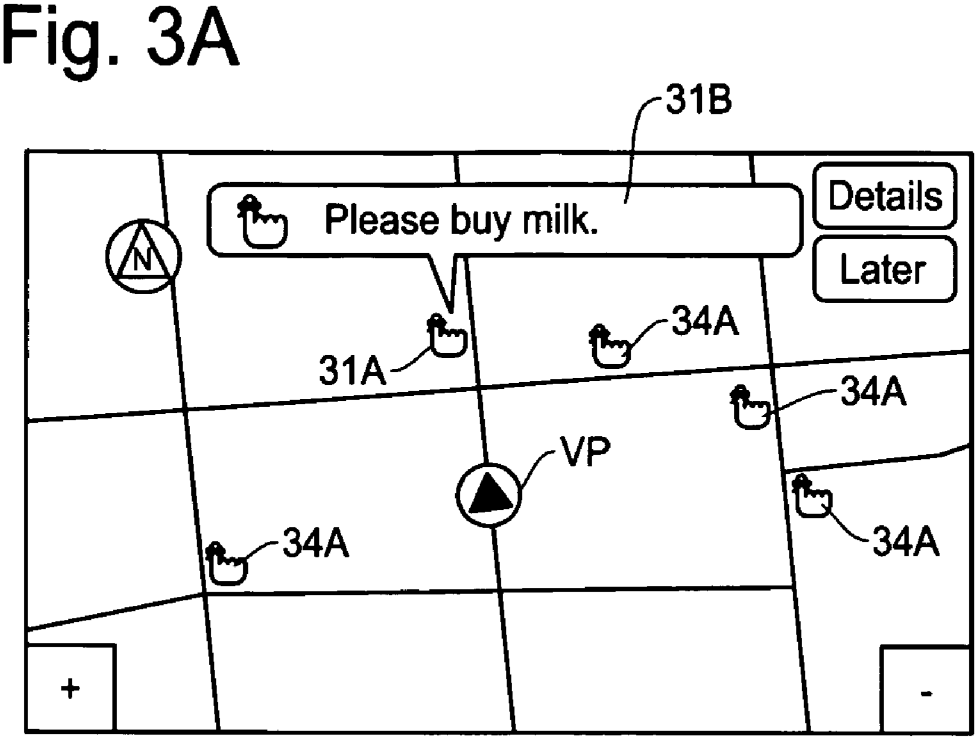
FIGS. 3A and 3B are alternative display examples of the location based reminder implemented in a navigation system under the present invention where a reference location for reminder is a current location.
Figure 3B:
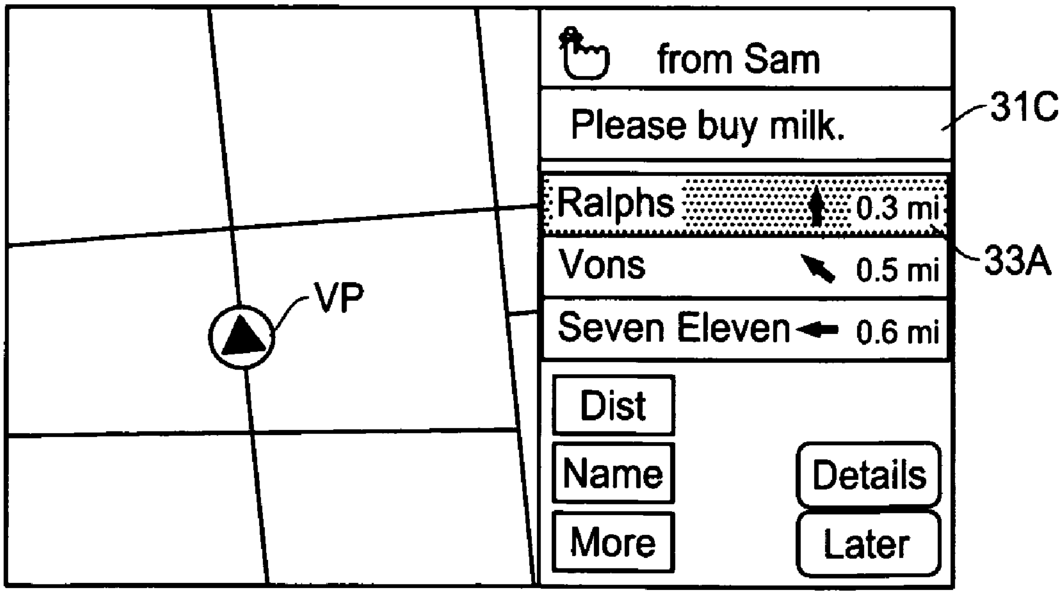

FIGS. 3A and 3B are other display examples that may be used in the location based reminder under the present invention for the same situation as described in FIGS. 2A and 2B. In the example of FIG. 3A, a message window 31B has a balloon like shape where the tip of its tail points the primary location 31A to which the reminder message is associated. Further, candidate suggested locations for accomplishing the action noted by the reminder message (to buy milk) are shown on the map image by icons 34A to prompt the user to select one of the suggested locations for the route guidance operation.

In the example of FIG. 3B, the display screen is divided into half, one of which shows the map image and the other shows the reminder information and associated function keys. The message content "Please buy milk" is shown in a message box 31C and three suggested locations are listed in the suggested locations list 33A. The reminder message icon and a name who created the reminder message are shown at the top of the right side of the screen.

In FIG. 3B, the user may press a "Details" button to see more details of the reminder message, or press a "Later" button to ignore the reminder. More entries of suggested locations will be shown by pressing a "More" button to find other locations through the display example 22 of FIG. 1D. Thus, the navigation system is able to show a reminder message in a variety of ways which will be accompanied by an audible alarm sound and/or a voice announcement to call the user's attention.

Figure 4:
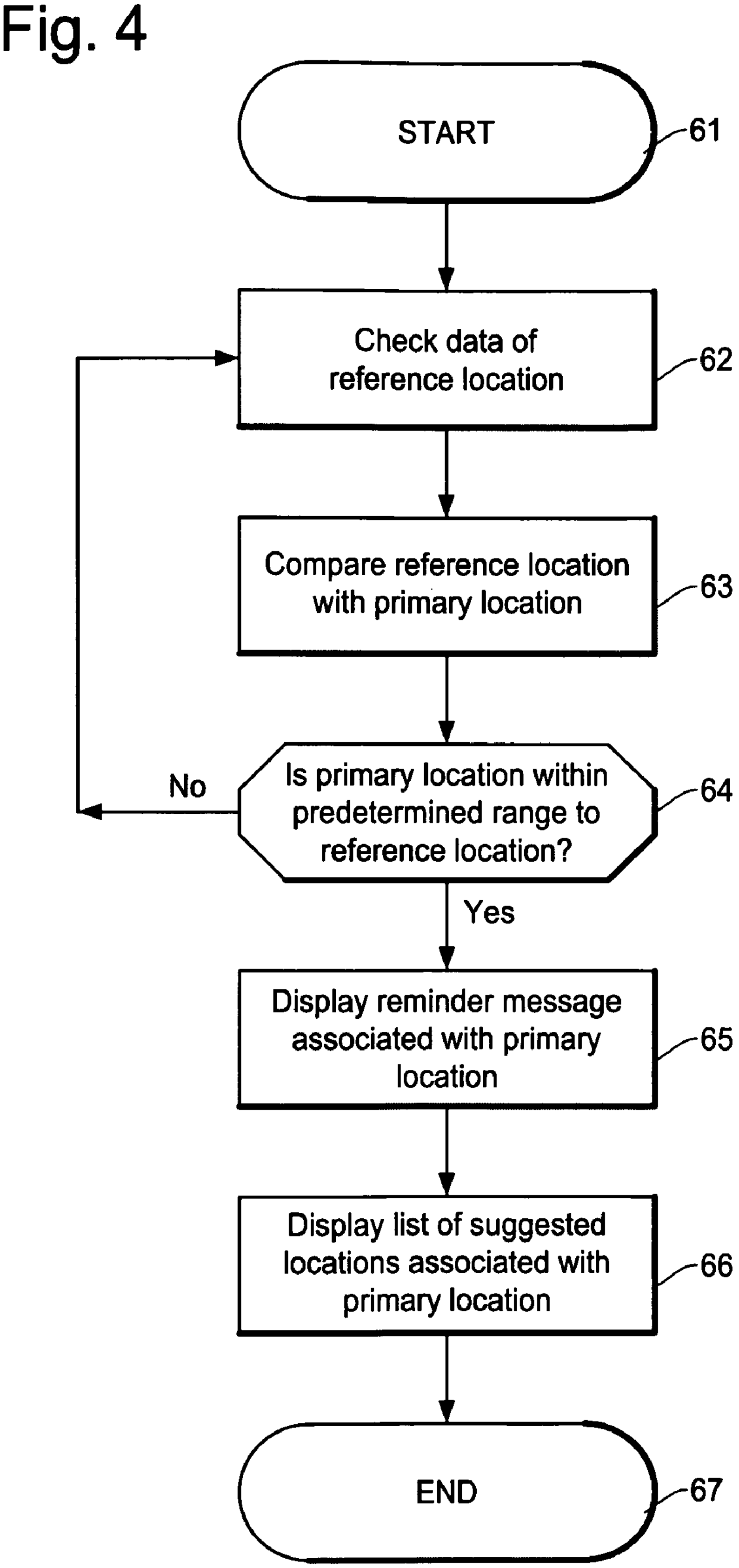
FIG. 4 is a flow chart showing an example of basic steps of operation for generating a location based reminder in the present invention.

FIG. 4 is a flow chart showing the basic steps of operation involved in the location based reminder under the present invention. The procedure starts in the step 61, then, the navigation system will check the reference location in the step 62 for the purpose of conducting the location based reminder. As noted above, the reference location may be a destination specified by the user as in the case shown in the displays in FIGS. 1A to 1D, or a current vehicle or user location as in the case described above with reference to FIGS. 2A and 2B.

In the step 63, the navigation system compares the reference location with the primary location (assigned location).

The primary location is used to determine whether a condition has been satisfied to issue a location based reminder. At the time of creating the reminder message, a primary location will be specified based on the type of reminder, such as a user's home if the reminder is to do some errands when the user is on the way home in the neighborhood of his/her home.

In the step 64, the navigation system will check whether the reference location (destination or current location) is within a predetermined distance range from the primary location. If the reference location is not within a predetermined range from the primary location, the procedure will go back to the step 62 and keeps checking the reference location to see whether the reference location comes within the predetermined distance range from the primary location. On the other hand, if the reference location is within the predetermined distance range from the primary location, the reminder message associated with the primary location will be generated in the step 65.

In the step 65, only the fact that there is a reminder message related to the primary location may be shown rather than the overall message such as the case in the display example 17 in FIG. 1B. Moreover, the reminder message on the display screen may be accompanied by an audible announcement, i.e., a voice message. Moreover, the message may be issued solely by the audible sound or voice rather than a text message on the display.

In the step 66, the navigation system will show a secondary location (suggested location) or a list of secondary locations associated with the primary location, such as shown in the suggested (secondary) locations list 33 on the display example 12 in FIG. 1A. The suggested location is a location to conduct the activity specified in the reminder message, such as a supermarket for buying the milk. The user is able to select the suggested location for the route guidance operation to go there. A reminder data may contain detailed information (data) on the suggested location, such as an address, distance, a POI type, a POI name, etc. The process ends in the step 67.

Figure 5:
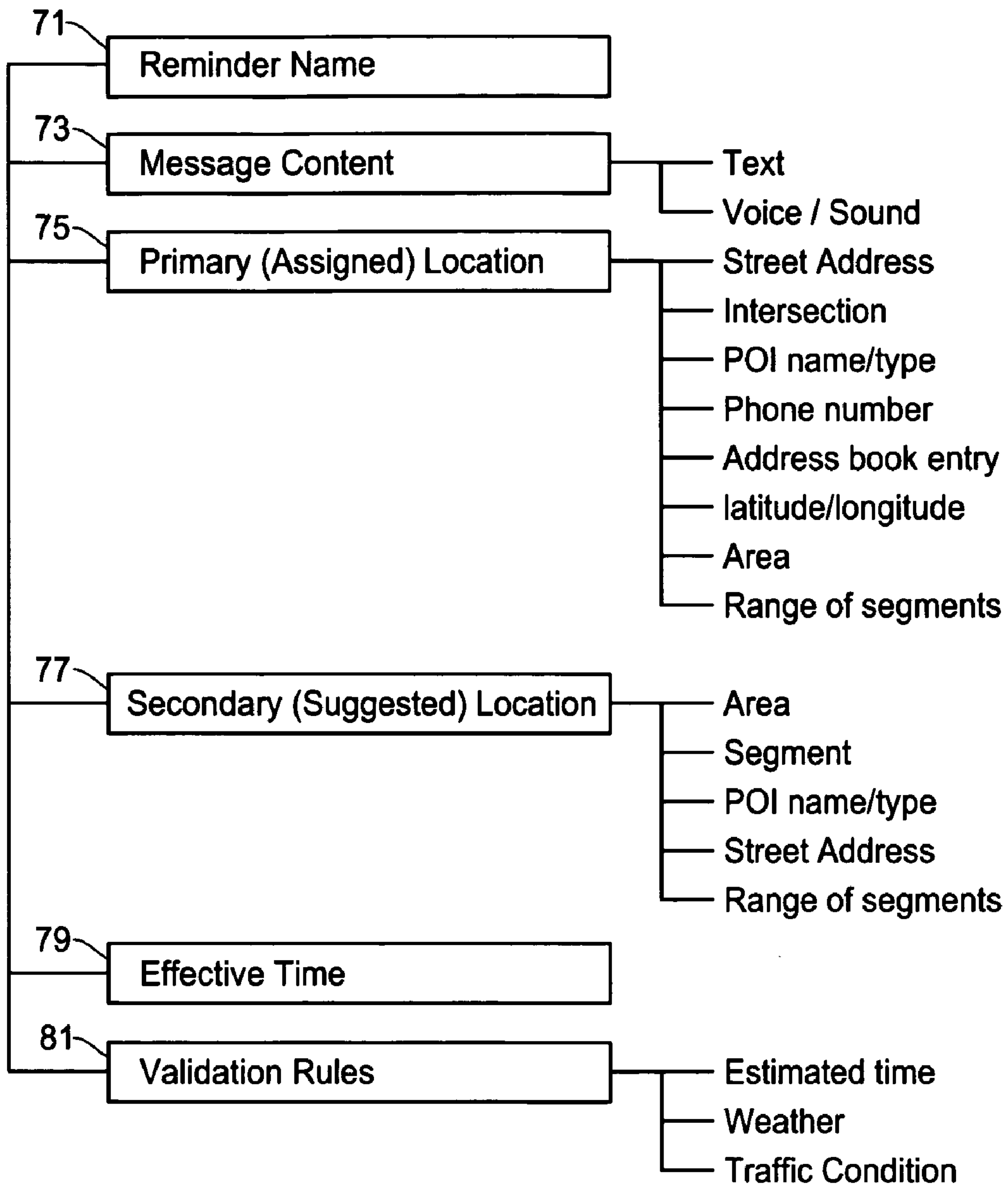
FIG. 5 is a schematic diagram showing an example of reminder message data to be stored in the navigation system and a structural relationship among the components of the message data according to the present invention.

FIG. 5 is a schematic diagram showing an example of structure of the data (information) for the reminder message in an embodiment of the present invention. In this example, the reminder message data generally comprises the components of a reminder name 71, a message content 73, an assigned location (primary location) 75, a suggested location (secondary location) 77, an effective time 79, and a validation rules 81. Each component of the data is further defined by more detailed data components or sub-categories, etc., as shown in the right side of FIG. 5.

The reminder name 71 is an assigned name for identifying a set of data for producing a particular location based reminder in the present invention. The message content 73 is a main message in the reminder message data such as "Please buy milk" which will be displayed and/or played back with audible sound at an appropriate time. The message content 73 is typically in a text form that informs the driver or the user of the vehicle through the screen of the navigation system but can be accompanied by the audible sounds as noted above.

The primary location (assigned location) 75 is a location that is relevant in determining a location and timing for issuing a reminder message. For example, a primary location will be a user's home if the reminder is to do some errands when the user is going back home in the neighborhood of his/her home. In another example, a primary location (assigned location) will be a friend's house if the reminder is to buy ice cream or cold drinks for the party at the friend's house.

The secondary (suggested) location 77 is the data of locations that are suggested when the activation rule is triggered, i.e., the reminder message is displayed. The suggested location 77 shows the location for achieving the activity requested by the reminder message. For example, if the reminder message is "Pease buy milk", the data for the suggested location will be a list of super markets so that the user can select one of them to buy the milk. The suggested locations will be specified by the user when creating the reminder message data or the navigation system will search the locations based on the information (ex. POI type) specified by the user.

The effective time 79 is the data to define a time frame or a time point for applying the validation rule in the location based reminder. For example, the effective time 79 defines a time range or a time limit for the reminder massage be effective, such as from Feb. 25-28, 2008 for picking up laundries, etc. The validation rule 81 is the data that defines how and when the location based reminder will be generated such as a distance range from a primary location or suggested locations, a current time for comparing with the effective time 79, etc.

As shown in FIG. 5, under some of the data types, a plurality of subcategory data may be attached which are created by the user or made available through the operation of the navigation system. For instance, the message content has text and voice/sound data as noted above to generate the reminder message by the simple text message and/or the voice message. The primary location 75 include information such as street address, intersection, POI name and type, telephone number, etc.

Similarly, the secondary location 77 has the subcategory data of street address, intersection, POI name/type, and area, etc. In the primary location 75 and the secondary location 77, "Area" in the subcategory data may include longitude/latitude data for a bounding box (polygon), a city name, or a specified radial distance from a particular location, etc. Further, "Range of Segment" in the subcategory may include collection of street names, a group of nearby freeway ramps, or along a street.

In determining whether the reference location (destination or current location) is within a predetermined distance range from the primary location or suggested location, the distance range may be as narrow as the address point itself, or it may be as wide as a city. Thus, in the former case, the condition would not be satisfied unless the reference location overlaps with the exact location of the primary location or the suggested location. In the latter case, the condition would be satisfied as soon as the reference location is within a range of the city having the primary location or the suggested location.

The validation rule 81 utilizes the data such as the assigned location 75, the suggested location 77, and the effective time 79 to determine the timing of generating the location based reminder message. Other criteria, such as an estimated time of arrival, weather condition, and/or traffic condition may also be taken into consideration. For instance, the navigation system will prompt the user to go to a park for a stroll only when the weather is fine but not when it is raining. Likewise, the navigation system may show a message for buying a certain item only when the there is not traffic congestion or accident near the current location and/or the suggested location.

A plurality of reminder messages can be assigned to a single location such as buying medicine and picking up printed photographs at a drug store. A single reminder message can be assigned to a plurality of locations such as distributing a program of the next private concert for each member of the guitar circle. A plurality of reminder messages can be assigned to a plurality of locations such as buying a flower at a florist and buy a book at a book store for visiting a sick friend.

A single reminder may contain a plurality of suggested locations along with priority rules for a selection method or for an efficient sequence of visits to a plurality of locations. The plurality of messages may contain the same assigned location or an overlapping area, in which case a predetermined priority method may be employed. Alternatively, the user may be presented with options to select the desired message or to determine the preferable sequence of visits.

The reminder data may also contain information on the time or duration, which can be used to define the effective time of the message, such as "effective after 10:30 AM today", "valid until 7:00 PM tomorrow", "between 8:00 AM and 6:00 PM on weekdays", "this weekend", "on Tuesdays", "on the third Monday of the month", "during construction at Magnolia/Bake intersection", etc. The reminder data may contain additional validation rules, such as "if rainy", "if traffic congestion causes at least 30 minutes of delay in an estimated time of arrival", "if the destination is within 20 miles from the current position", etc. The user may optionally search for a nearby POIs of a suggested location. The navigation system may also be equipped with a function to receive information on traffic incidents and conditions around the suggested location.

Figure 6:
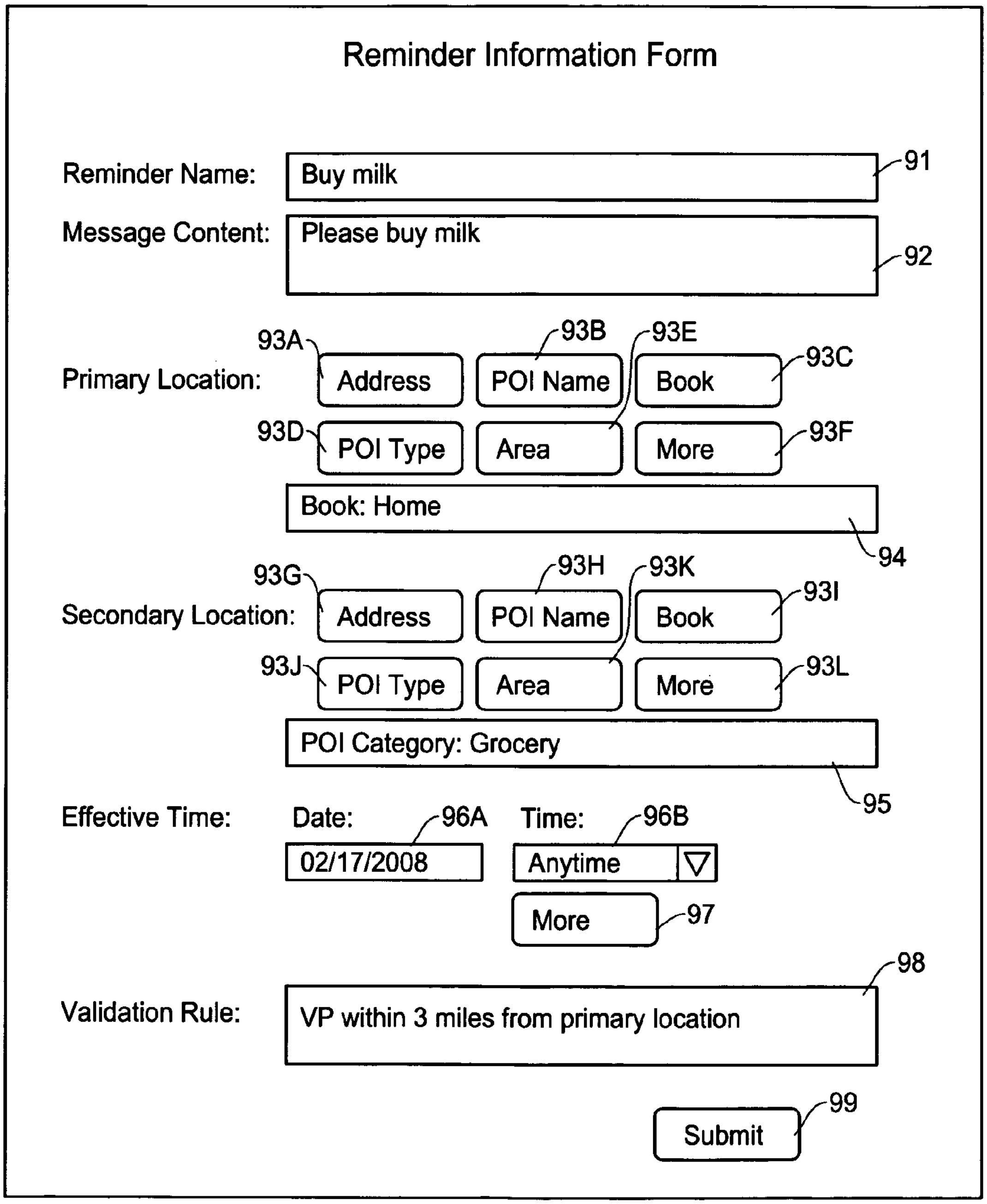
FIG. 6 is a schematic diagram showing an display example for inputting information through a web browser to create the reminder message data of FIG. 5 which will be transmitted to the navigation system.

FIG. 6 is a schematic diagram showing a display example of a personal computer for inputting the reminder message data through a web browser in accordance with the present invention. The display is arranged to establish the reminder message data in such a structure shown in FIG. 5 as described above. The reminder message data created through the web browser will be transmitted to the navigation system through a wired communication, or by inserting a memory card in the navigation system, or through wireless transmission such as by a transceiver. As described above, the reminder message data may also be directly set in the navigation system by inputting such data through a keyboard of the navigation system.

In the example of FIG. 6, the user is able to input necessary information through various input fields on the display to create the reminder message data. The display example includes input fields indicated by a reminder name input field 91, a message content input field 92, a primary (assigned) location input field having buttons 93A-93F and an input window 94, and a secondary (suggested) location input field having buttons 93G-93L and an input window 95, an effective time input filed having buttons 96A-96B and 97, and a validation rule input field 98.

The user can select and type in the reminder name in the reminder name input field 91, which is used to identify the particular reminder message. The message content input field 92 is for inputting the main message such as "Please buy milk" to be displayed on the navigation screen. The assigned (primary) location category has a plurality of buttons from which the user selects an appropriate button to specify the location data.

The "Address button" 93A is selected to specify the address of the primary location in the input window 94, the "POI Name" button 93B is selected to specify a POI name of the primary location in the input window 94. The "Book" button 93C is used to enter a primary location from an address book of the navigation system, and the "POI Type" button 93D is used to enter a category of POI, such as a grocery store, restaurant, etc. in the input window 94. The "Area" button 93E allows the user to specify an area such as a city name in the input window 94. The "More" button 93F is provided to enter other relevant information.

With respect to the suggested (secondary) location, the "Address" button 93G is selected to specify the address of the secondary location in the input window 95, and the "POI Name" button 93H is selected to specify a POI name of the secondary location in the input window 95. The "Book" button 93I is used to enter a secondary location from the address book of the navigation system, and the "POI Type" button 93J is used to enter a category of POI, such as a grocery store, restaurant, etc. in the input window 95. The "Area" button 93K allows the user to specify an area such as a city name in the input window 95. The "More" button 93L is provided to enter other relevant information.

The effective time for activating the reminder message is specified through the "Date" button 96A to enter a date, and the "Time" button 96B to enter the time. The "More" button 97 is provided for entering other types of relevant information. The validation input filed 98 is used to enter the validation rule as to how and when the location based reminder will be generated such as a distance range from the primary location or suggested locations, a current time for comparing with the effective time 79, etc. After entering the intended data for the reminder message, the user will press a "Submit" button 99 to send the reminder message data created in the foregoing to the navigation system.

Figure 7A:
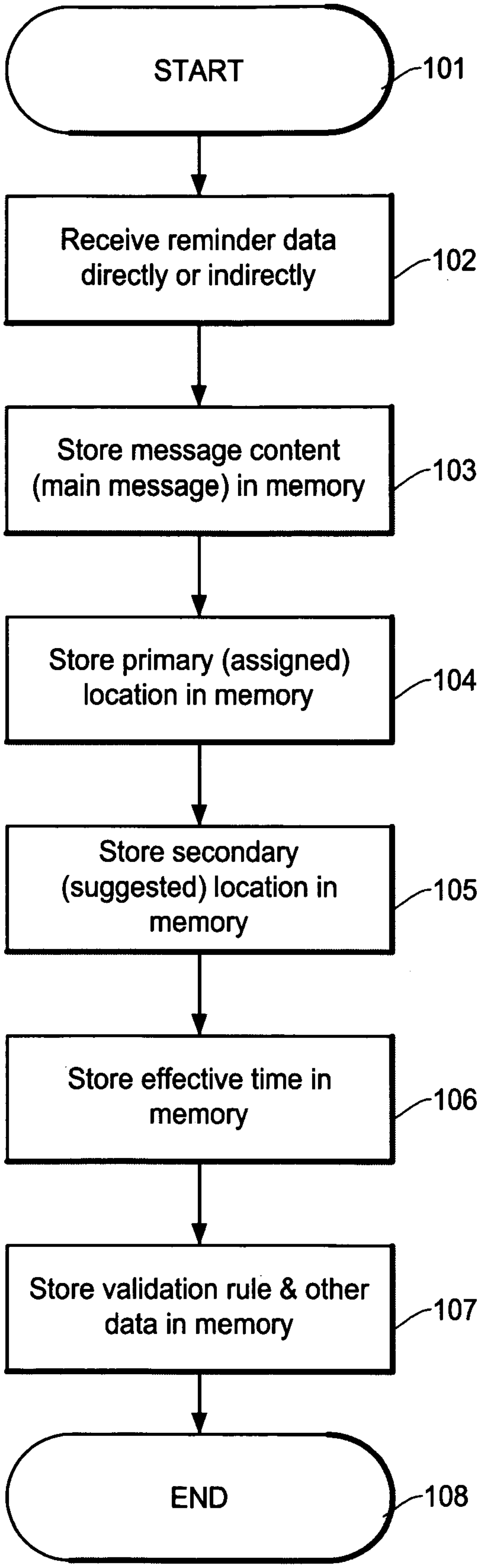
FIG. 7A is a flow chart showing the steps of creating a reminder message in the navigation system for the location based reminder under the present invention.
Figure 7B:
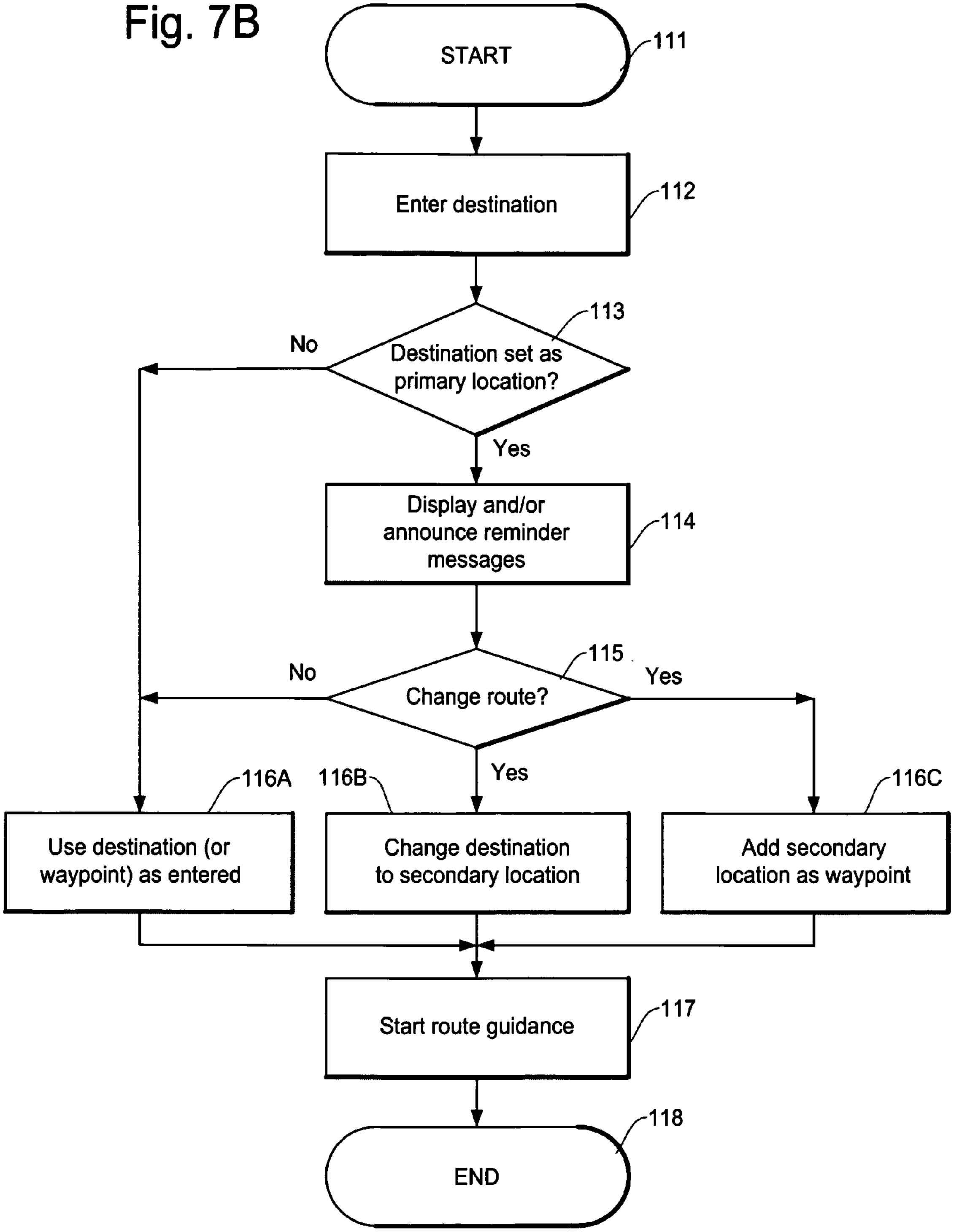
FIG. 7B is a flow chart showing the process of generating the location based reminder on the screen when a destination has been specified.
Figure 7C:
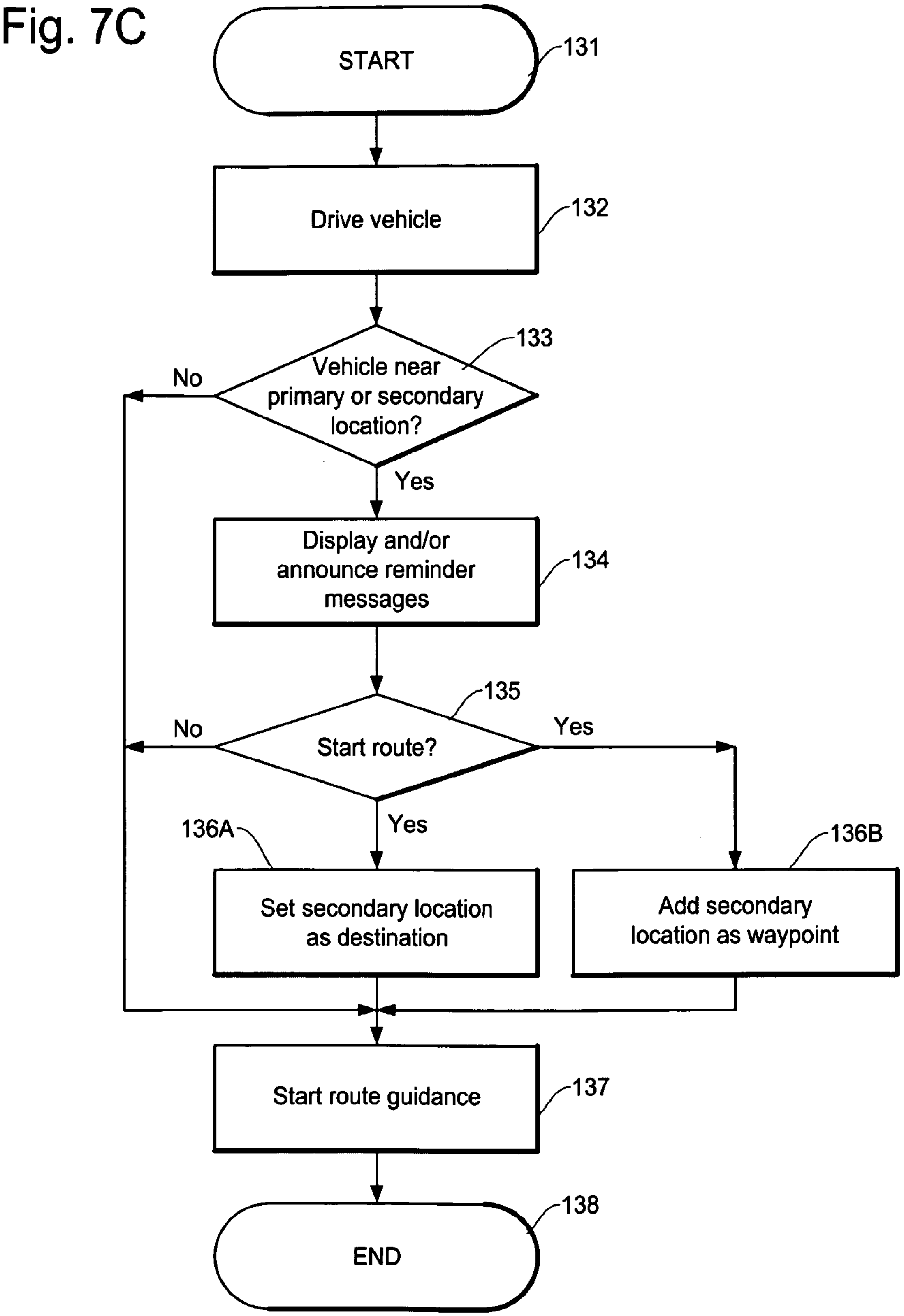
FIG. 7C is a flow chart showing the process of generating the location based reminder on the screen where a reference location is a current vehicle position rather than a destination.

Examples of operational steps involved in the embodiments of the present invention are described with reference to the flow charts of FIGS. 7A to 7C. FIG. 7A is a flow chart showing the process of creating a reminder message in the navigation system for the location based reminder under the present invention, FIG. 7B is a flow chart showing the process of generating the location based reminder on the screen when a destination has been already specified, and FIG. 7C is a flow chart showing the process of generating the location based reminder on the screen where the reference location is a current vehicle position rather than a destination.

In the flow chart of FIG. 7A, the procedure for establishing the reminder message data in the navigation system starts at the step 101. This procedure typically starts when the reminder message data created through the web browser will be transmitted to the navigation system wirelessly. As noted above, it is also possible to start the procedure by inserting a memory card containing the reminder message data in the navigation system. As also described above, the reminder message data may also be directly set in the navigation system by inputting such reminder data through a keyboard or other arrangement displayed on the navigation system.

Figure 9:
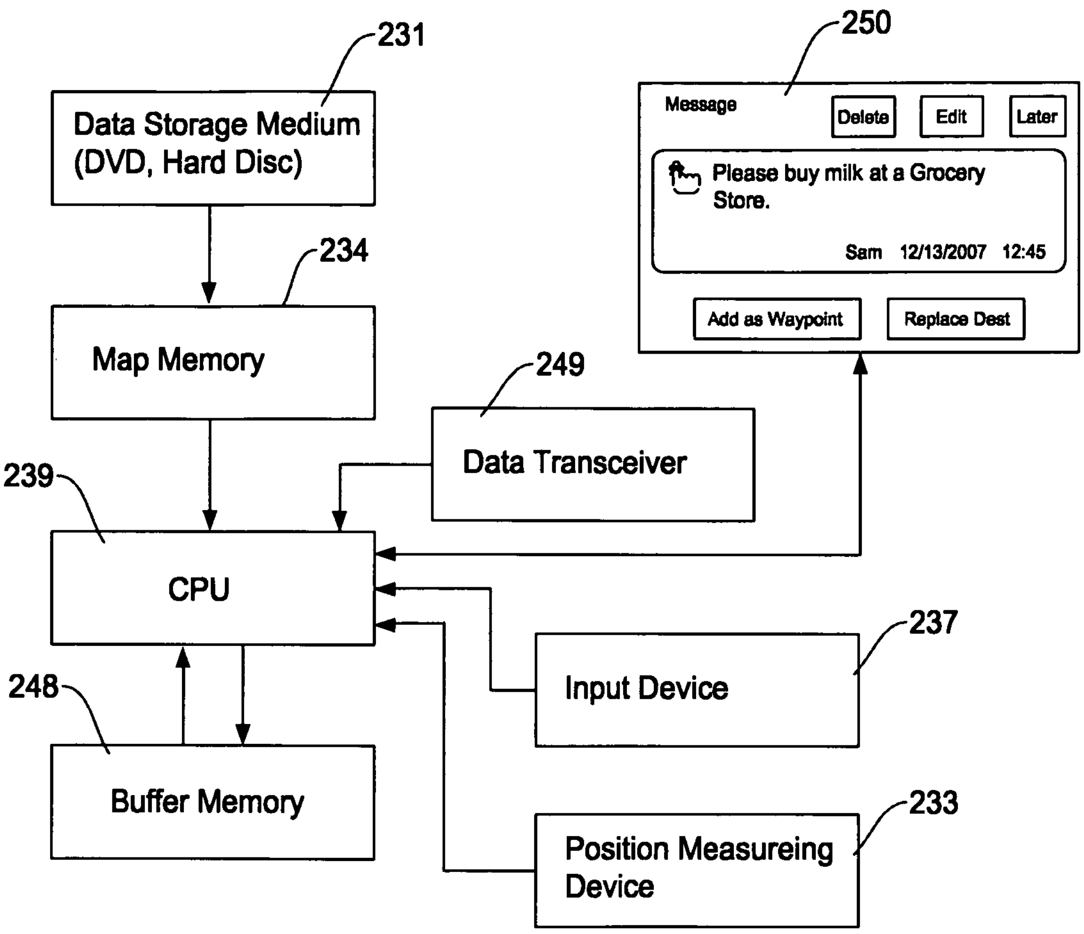
FIG. 9 is a functional block diagram showing an example of basic structure of the apparatus having the navigation function and implementing the location based reminder of the present invention.
Figure 10:
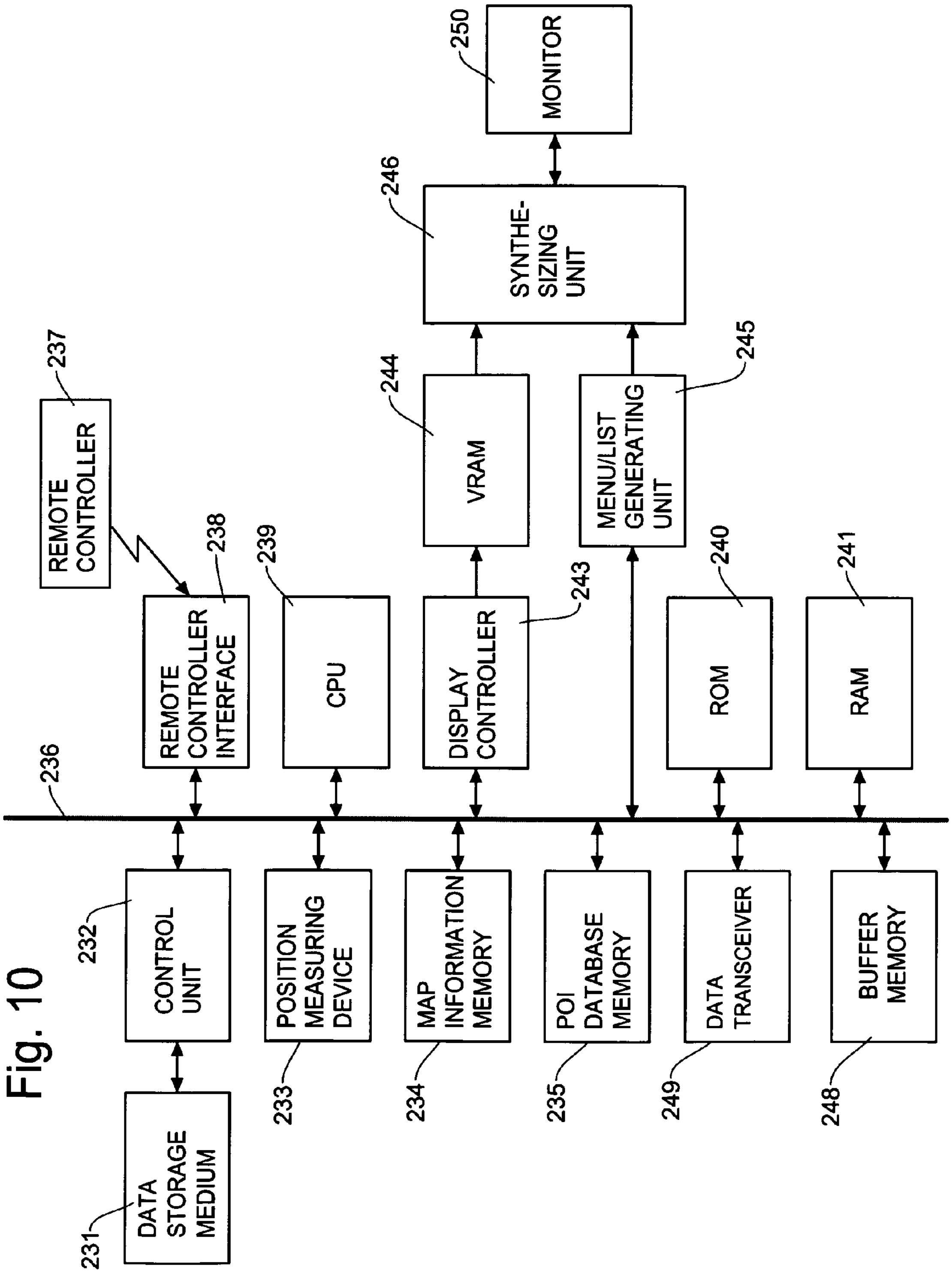
FIG. 10 is a functional block diagram showing an example of structure of a vehicle navigation system implementing the location based reminder method under the present invention.

Then, in the step 102, the navigation system will receive the reminder message data through, for example, a data transceiver 249 (FIGS. 9 and 10). The navigation system then stores the received reminder message data in a memory such as a buffer memory 248 (FIGS. 9 and 10) therein. As described above with reference to FIGS. 5 and 6, the reminder message data is configured by the reminder name 71, message content 73, assigned location (primary location) 75, suggested location (secondary location) 77, validation rule 81, etc. Thus, the steps 103-107 shown in the flow chart of FIG. 7A may be performed in a different order or at the same time.

In the step 103, the message content (main message) such as "Please buy milk" in the reminder message data is stored in the navigation system. In the step 104, the primary location (assigned location) in the reminder message data is stored in the navigation system. As noted above, the primary location is a location compared with a reference location by which the reminder message will be triggered to be displayed on the screen or otherwise generated by the navigation system. In the example described with reference to FIGS. 1A-1D above, the primary (assigned) location is a user's home.

In the step 105, the secondary location (suggested location) in the reminder message data is stored in the navigation system. The secondary location is one or more locations that the user can conduct the activity (ex. buy milk) stated in the reminder message. The secondary location can also be a location compared with a reference location by which the reminder message will be triggered to be displayed on the screen or otherwise generated by the navigation system. In the example described with reference to FIGS. 1A-1D above for buying the milk on the way home, the secondary locations are supermarkets or other stores in the neighborhood of the user's home.

In the step 106, the effective time in the reminder message data is stored in the navigation system. The effective time is the data that define a time frame or a time point as a factor for applying the validation rule in the operation of the location based reminder. For example, the effective time defines a time range or a time limit for the reminder massage be effectively generated. Thus, suppose the effective time is a time range which is within this week, the reminder message will no longer be generated in the next week.

In the step 107, the validation rule and other data in the reminder message data is stored in the navigation system. The validation rule is the data that defines how and when the location based reminder should be generated such as a distance range of the reference location from the primary location or suggested locations. The other data include the reminder name which is an assigned name for identifying the set of reminder message data for producing the location based reminder in the present invention. After storing all the reminder message data in the above steps, the process ends in the step 108.

The process of FIG. 7B for generating the location based reminder message, when the destination is set, starts at the step 111. In other words, this scenario assumes that the user specifies a location for the route guidance, either as a destination (final destination) or as a waypoint (intermediate destination). Thus, the primary location is the destination or waypoint with which the reference location (which is also the destination or waypoint) is compared for its proximity in accordance with the validation rule noted above.

As the procedure starts, the user inputs a destination in the navigation system at the step 112. The destination may be any type of place selected through various input methods, such as an address book, POI name or category, telephone number, or inputting an address or intersection, pointing a cursor on a map image, etc. In the example of FIGS. 1A to 1D described above, the destination (primary location) is a user's "Home" for buying the milk on the way home in the neighborhood of the home.

As noted above, the user's input is not limited to a destination (final destination) but may be a waypoint (intermediate destination) as well. When the user has input a destination or waypoint, the navigation system checks whether the destination is at or near the primary location or secondary location in the step 113 as defined by the validation rule. If it is negative in the step 113, the navigation system will move to the step 116A wherein the destination or waypoint will be set as a place to go via the route guidance operation.

On the other hand, if the condition is met in the step 113, i.e., the destination is within the distance defined by the validation rule from the primary location or secondary location, the navigation system will display and/or voice announce the reminder message associated with the destination or waypoint in the step 114. In the step 115, the navigation system will determine whether the route is to be changed by checking the user's action. The user may choose to ignore the reminder message and proceed to the initially input destination or waypoint. In the display example 11 shown in FIG. 1A, this corresponds to pressing the "Go" key to proceed to the route calculation process of the display example 14 in the step 116A noted above.

When the user wants to see more details of the reminder message, the user selects the "View Message" key or its equivalent on the display examples 11, 12, 15 and 16 in FIGS. 1A and 1B. In response, the navigation displays, among others, a list of suggested (secondary) locations, as shown in the display examples 12 and 16. Thus, in the step 115, the user may select a secondary (suggested) location to replace the original destination with the suggested location, thereby proceeding to the step 116B. Alternatively, the user adds the secondary location as a waypoint (intermediate destination), thereby proceeding to the step 116C.

In the step 117, the navigation system will calculate a route to the original destination (from the step 116A) or to the replaced destination (from the step 116B) or to the waypoint (from the step 116C). Then, the navigation system conducts the route guidance operation to guide the user to the destination or waypoint through the calculated route. The user will finish the activity specified by the reminder message at the destination or the waypoint and the process ends in the step 118.

The flow chart shown in FIG. 7C describes the case where the reminder message will be produced while driving based on the current location, rather than being triggered by the user's input of a destination or waypoint. Namely, the current location is the reference location to which the primary or secondary location is compared with respect to its proximity. The procedure starts in the step 131. The user drives a vehicle in the step 132 during which the current location is constantly monitored by the navigation system which may already be in the route guidance mode or may not be in the route guidance mode.

In the step 133, while the vehicle is travelling, the navigation system constantly checks whether the vehicle is located near the primary or secondary location. When the navigation system detects that the current vehicle position is within a predetermined distance from the primary or secondary location defined by the validation rule, it will display and/or voice announce the reminder message in the step 134. As an example, when the user happens to drive near a regular laundry, the navigation system will produce the message "Pick up the jacket at Deluxe Cleaner" to remind the user to pick up the jacket at the laundry.

In the step 135, the navigation system determines what the user intends to do in response to the reminder message and the secondary (suggested) location attached to the reminder message. In other words, the navigation system prompts the user to select either to go to the suggested location to do the activity specified by the message or not. The user may choose to ignore the message and proceed to the initially input destination or waypoint in which case the procedure moves to the step 137.

Assuming that the vehicle is in the route guidance mode in the step 132 noted above wherein already at least one destination has been set, the navigation system continues the route guidance in the step 137 and the process ends at the step 138. When the user selects to set the secondary location as a destination in step 135, the procedure will move to the step 136A in which the secondary location is set as a destination. When the vehicle has already been in the route guidance mode, the original destination will be replaced by the secondary location (final destination).

When the user selects to set the secondary location as a waypoint in the step 135, the procedure will move to the step 136B in which the secondary location will be set as a waypoint (intermediate destination). In the step 137, the navigation system calculates the route to the secondary (suggested) location for route guidance and starts the route guidance operation. Finally, the user will complete the activity (ex. buy milk) specified by the reminder message at the destination or the waypoint and the process of FIG. 7C ends in the step 138.

Several examples of cases implementing the method of generating a location based reminder message in the present invention will be described with reference to FIGS. 8A-8G. By taking advantage of the process and configurations described above, the present invention is able to add useful and enjoyable functions to the navigation system. As noted above, the data of the location based reminder in the following embodiments are typically comprised of a reminder name, message content, assigned location, suggested location, effective time, and validation rule.

Case 1

In this case, a single message is sent by the spouse of a user similar to the examples described above with reference to FIGS. 1A to 1D. The following settings are made as the reminder message data in the navigation system:

(1) Reminder Name: "Buy Milk"
(2) Message Content: "Get the milk on the way home"
(3) Assigned (Primary) Location: "Home"
(4) Suggested (Secondary) Location: Grocery Store, Convenience Store (POI types)
(5) Effective Time: Until tomorrow
(6) Validation Rule: VP (vehicle position) or route within 3 miles from the assigned location.

Figure 8A:
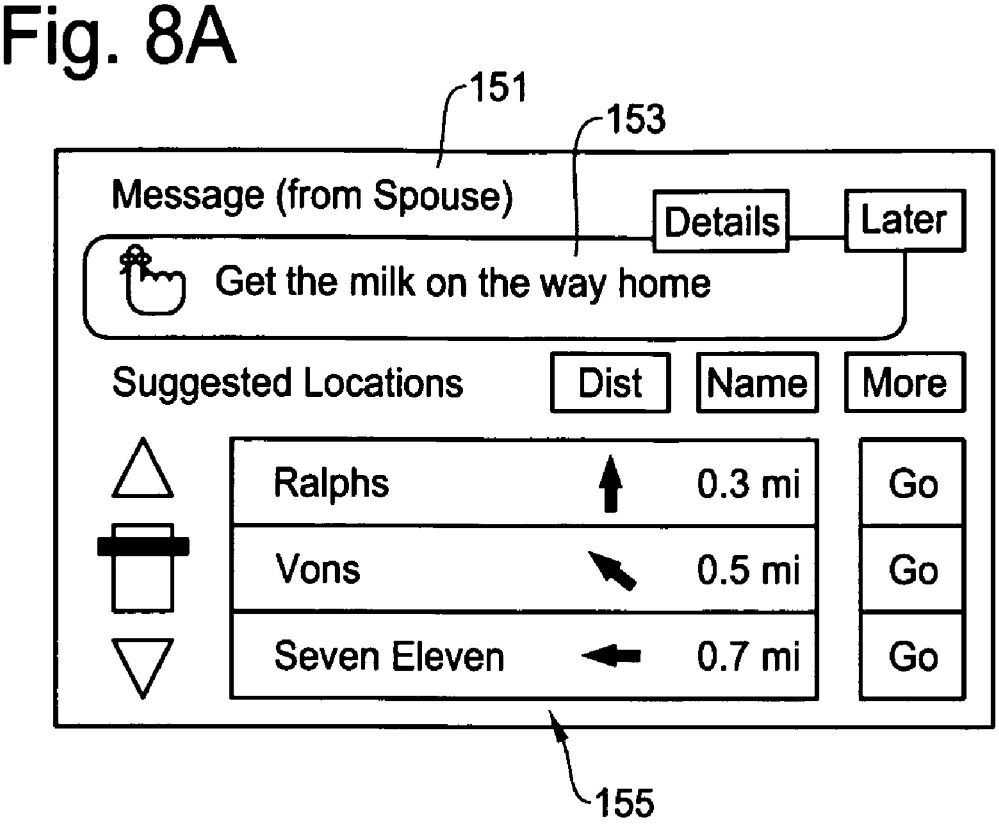
FIGS. 8A-8G are schematic diagrams showing display examples of the navigation system related to various cases for producing the location based reminder messages in the present invention where FIGS. 8A-8E correspond to the cases 1-5, respectively, and FIGS. 8F-8G correspond to the case 6 in the specification.

A display example of the case 1 is shown in FIG. 8A which is similar to the display example 12 in FIG. 1A. In the settings above, when the vehicle position (VP) comes within 3 miles from the assigned (primary) location "Home", either while in driving or by inputting a location for route guidance, the triggering condition for generating the reminder message is satisfied according to the validation rule. The suggested (secondary) location is set as POI category of grocery store or convenience store for conducting the activity of buying milk.

The effective time is also checked. In this example, the reminder will not be effective when the time has passed two days from the reminder setting date. In the display example of FIG. 8A, the message origin indicator 151 indicates that the message is sent by a spouse. The message content shows "Get the milk on the way home" and a suggested location list 155 shows a list of POI entries of grocery store or convenience store which have been searched by the navigation system. The user is able to select a particular entry from the suggested location list 155 for a route guidance operation to reach the selected location.

Case 2

The following settings are made as the reminder message data in the navigation system:

(1) Reminder Name: "Volleyball Venue Change"
(2) Message Content: "Meet at the main gym at 6:30 pm"
(3) Assigned Location: "West High School" (POI name)
(4) Suggested Location: "Torrance Recreation Center" (POI name)
(5) Effective Time: Next Sunday afternoon
(6) Validation Rule: The assigned location becomes the destination, or VP comes within 10 miles.

Figure 8B:
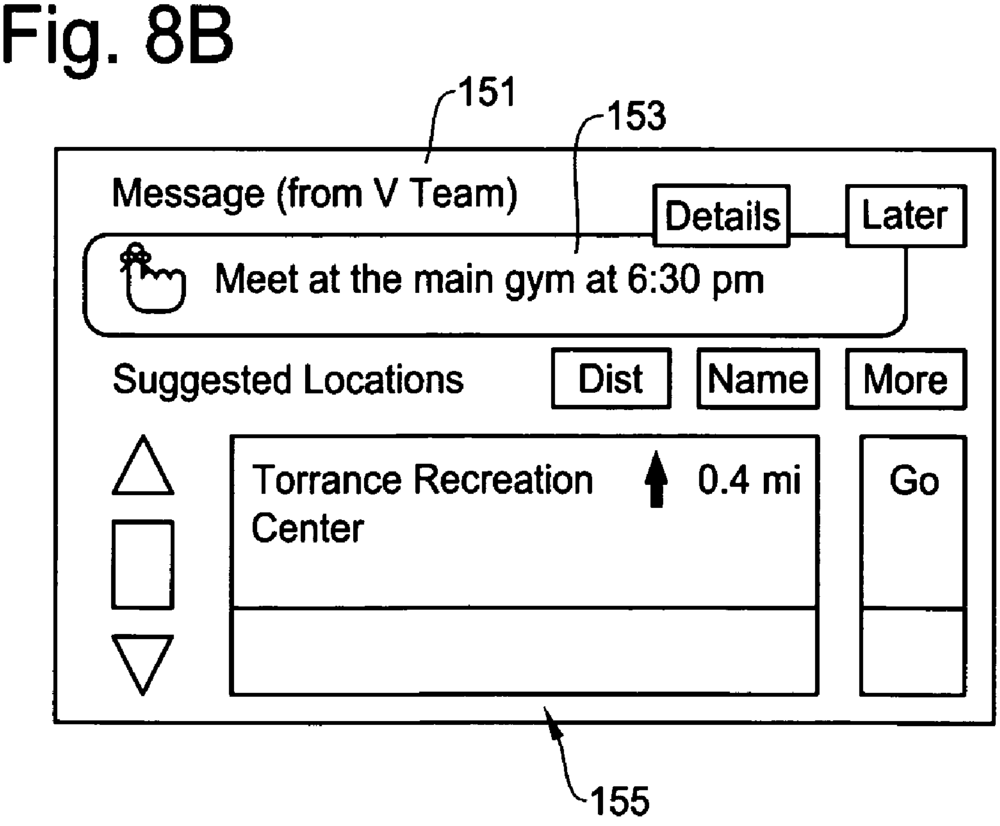

A display example of the case 2 is shown in FIG. 8B where the reminder message may be set by a third person such as teammate or by the user himself. The suggested location is a specific place (POI name) as opposed to a category of POI in the case 1. In this case, only a particular place name "Torrance Recreation Center" is shown as the suggested location. The message content 153 showing "Meet at the main gym at 6:30 pm" is sent by volleyball team as indicated in the message origin indicator 151. According to the validation rule, the reminder message will be generated by the navigation system when the assigned location "West High School" is set as a destination or the vehicle comes within 10 miles from the primary location.

Case 3

The following settings are made as the reminder message data in the navigation system:

(1) Reminder Name: "South Bay Foodie: New Find"
(2) Message Content: "Try this new restaurant: Flavors of Peru. It's great"
(3) Assigned Location: "All restaurants" (POI type)
(4) Suggested Location: "1234 Main St, Torrance, Calif."
(5) Effective Time: This month
(6) Validation Rule: Assigned location is selected, or VP or route within 2 miles from the suggested location.

Figure 8C:
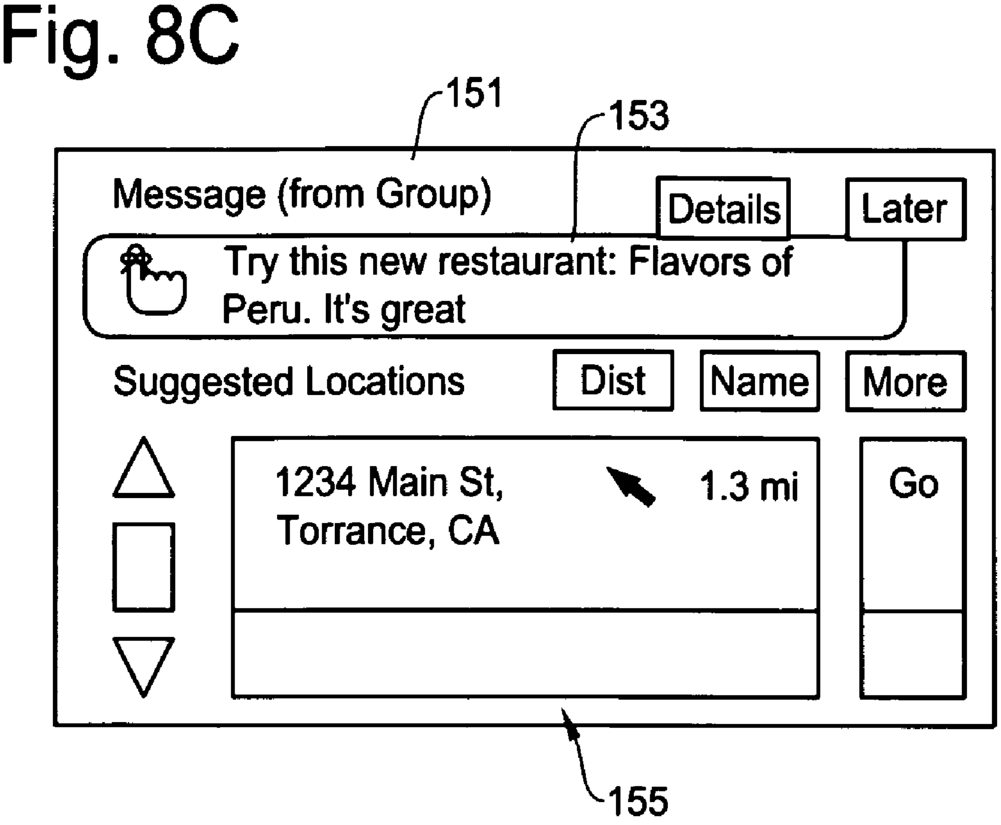

A display example of the case 3 is shown in FIG. 8C where the reminder message may be set by a group of members related to the user as shown by the message origin indicator 151. In this case, when the user attempts to select a restaurant POI as a destination, the message will be generated to inform a recommended restaurant. The message is also displayed when the user comes close to the restaurant (suggested location). The suggested location list 155 indicates an address of the restaurant.

Case 4

The following settings are made as the reminder message data in the navigation system:

(1) Reminder Name: "Laundry Pickup"
(2) Message Content: "Jacket ready by 3/23"
(3) Assigned Location: "Albertsons near home" (Address book entry)
(4) Suggested Location: "Deluxe Cleaners" (POI name)
(5) Effective Time 1: From 03/23/2008 to 03/29/2008
(6) Validation Rule 1: The assigned location becomes the destination
(7) Effective Time 2: After 03/30/2008
(8) Validation Rule 2: VP or route within 1 mile from the assigned or suggested location.

Figure 8D:
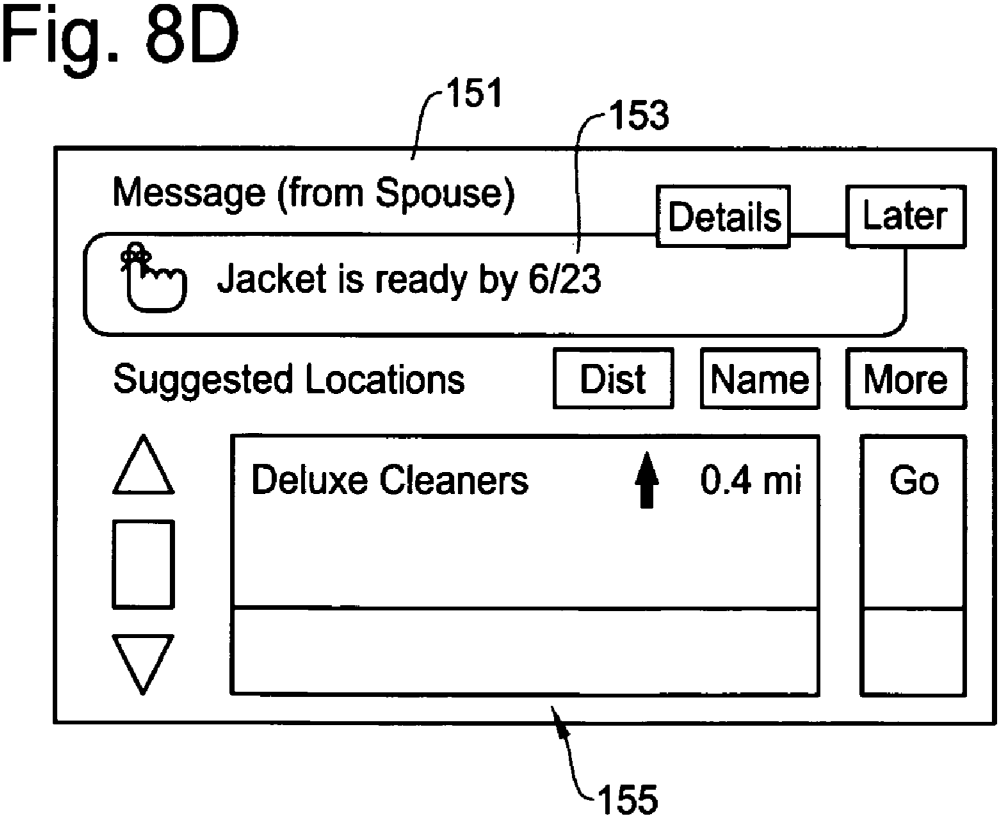

A display example of the case 4 is shown in FIG. 8D where the reminder message is sent by a spouse of the user as shown by the message origin indicator 151. As indicated above, a plurality of the effective times and the validation rules may be set. In this example, the reminder message will be produced during the period between 03/23/2008 to 03/29/2008 if the assigned location is set as a destination. Alternatively, the reminder message will be produced after 03/30/2008 if the current vehicle position comes within one mile from the assigned location or suggested location. The suggested location list 155 indicates the location of a particular POI name "Deluxe Cleaner" for the user to pick up the laundry.

Case 5

The following settings are made as the reminder message data in the navigation system:

(1) Reminder Name: "South Parking Entrance Closed. Campus traffic flows altered"

(2) Message Content: "Emergency repair work. Use alternative entrances"
(3) Assigned Location: "Any address within the University of California, Irvine, campus"
(4) Suggested Location: "E Campus Dr" or "University Ave" as a waypoint
(5) Effective Time: Until further notice (until the message is canceled)
(6) Validation Rule 1: If in guidance, route goes through or arrives at the assigned location (once per guidance)
(7) Validation Rule 2: If no guidance, VP within 1 mile from the assigned location (first time each day).

Figure 8E:
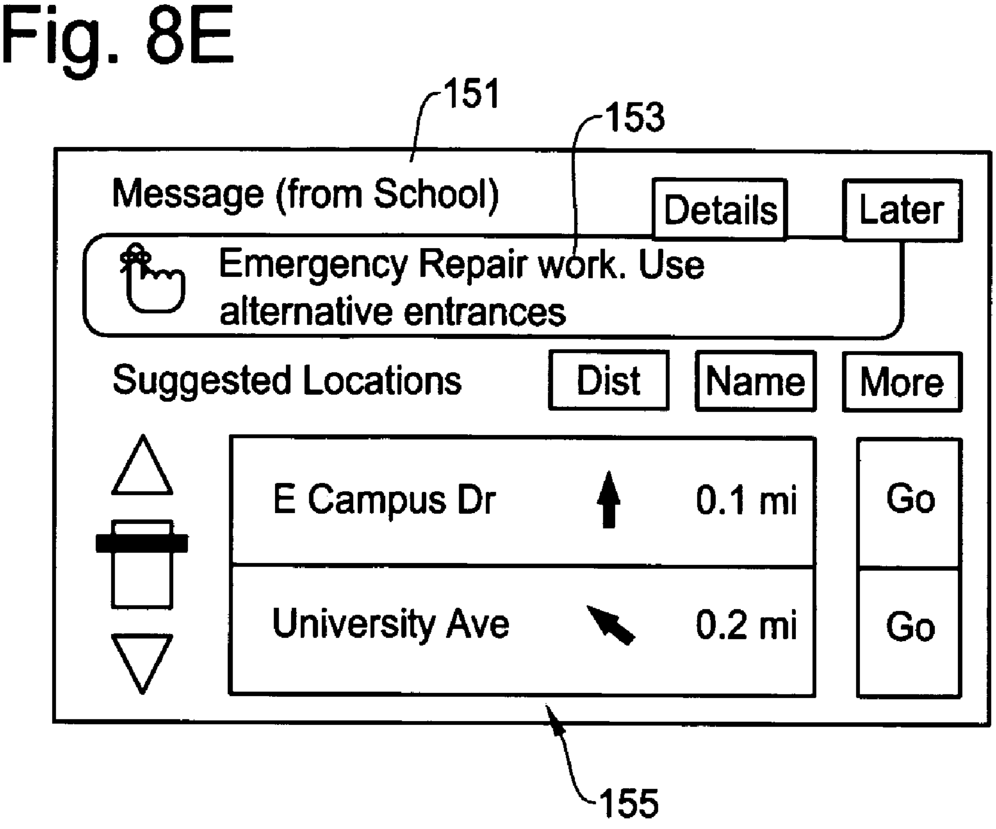

FIG. 8E shows a display example of the case 5, where the suggested locations are "E Campus Dr" and "University Ave" as shown in the suggested location list 155. The message origin indicator 151 shows that the message has been sent by a school. This is an example in which a reminder message is sent by the school to a plurality of users, for example, students and faculty members. As noted above, the validation rule differs depending on whether the vehicle is in a route guidance mode or not as indicated by the validation rules 1 and 2. The reminder message will be produced every time when the vehicle comes to the assigned location or within one mile from the assigned location until the message is canceled by the school.

Case 6

The following settings are made as the reminder message data in the navigation system:
(1) Reminder Name: "Tue/Thu Dinner"
(2) Assigned Location: "Home"
(3) Effective Time: Tuesdays and Thursdays
(4) Validation Rule 1: If expected time of arrival is before 6:30 PM
(5) Message Content 1: "Get a takeout dinner for four"
(6) Suggested Location 1: Chinese, Mexican, or "Subway Sandwiches" within 2 miles of VP or route
(7) Validation Rule 2: If expected time of arrival is between 6:30 PM and 7:00 PM
(8) Message Content 2: "Call ahead and pick up a pepperoni pizza"
(9) Suggested Location 2: "Pizza Hut on 190th St" (Address Book entry)
(10) Validation Rule 3: If expected time of arrival is after 7:00 PM
(11) Message Content 3: "Call wife to discuss dinner arrangement"
(12) Suggested Location 3: None.

In this scenario, the suggested location and message content in the reminder message will vary depending on the expected time of arrival. Namely, if the expected time of arrival is before 6:30 PM, the message "Get a takeout dinner for four" will be displayed, while the message "Call ahead and pick up a pepperoni pizza" will be displayed if the expected time is between 6:30 PM to 7:00 PM. The message "Call wife to discuss dinner arrangement" will be shown if the expected time of arrival is after 7:00 PM. The suggested location also varies depending on the expected time as indicated by the suggested locations 1-3.

Figure 8F:
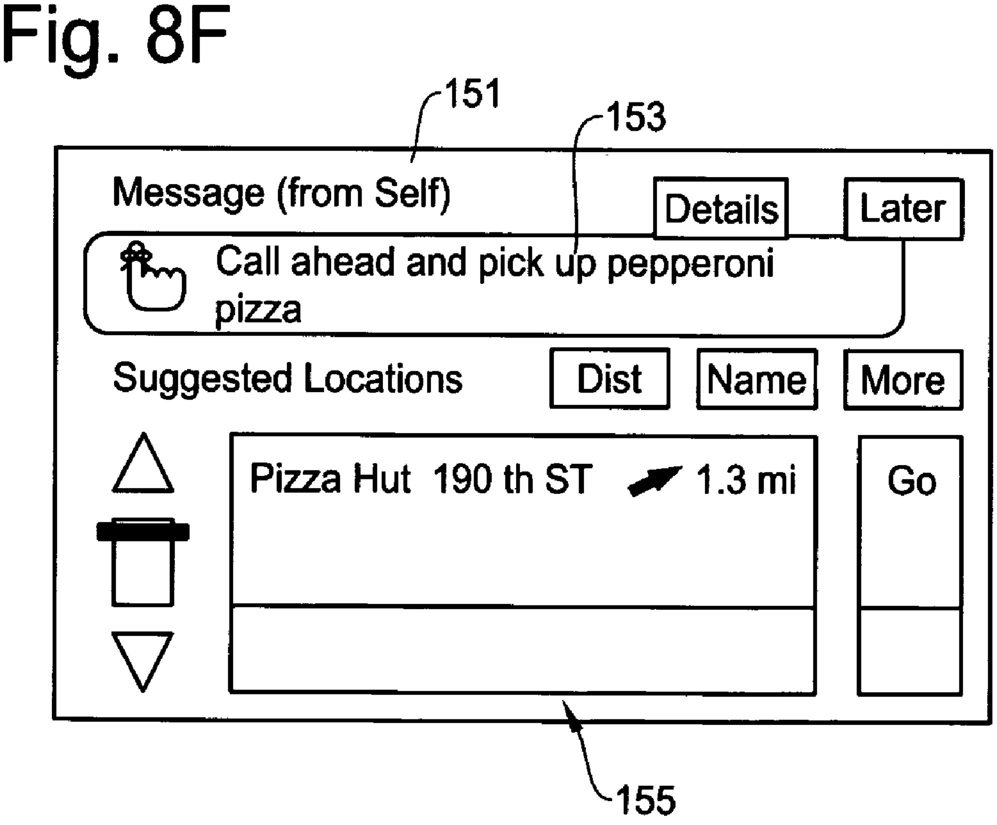
Figure 8G:
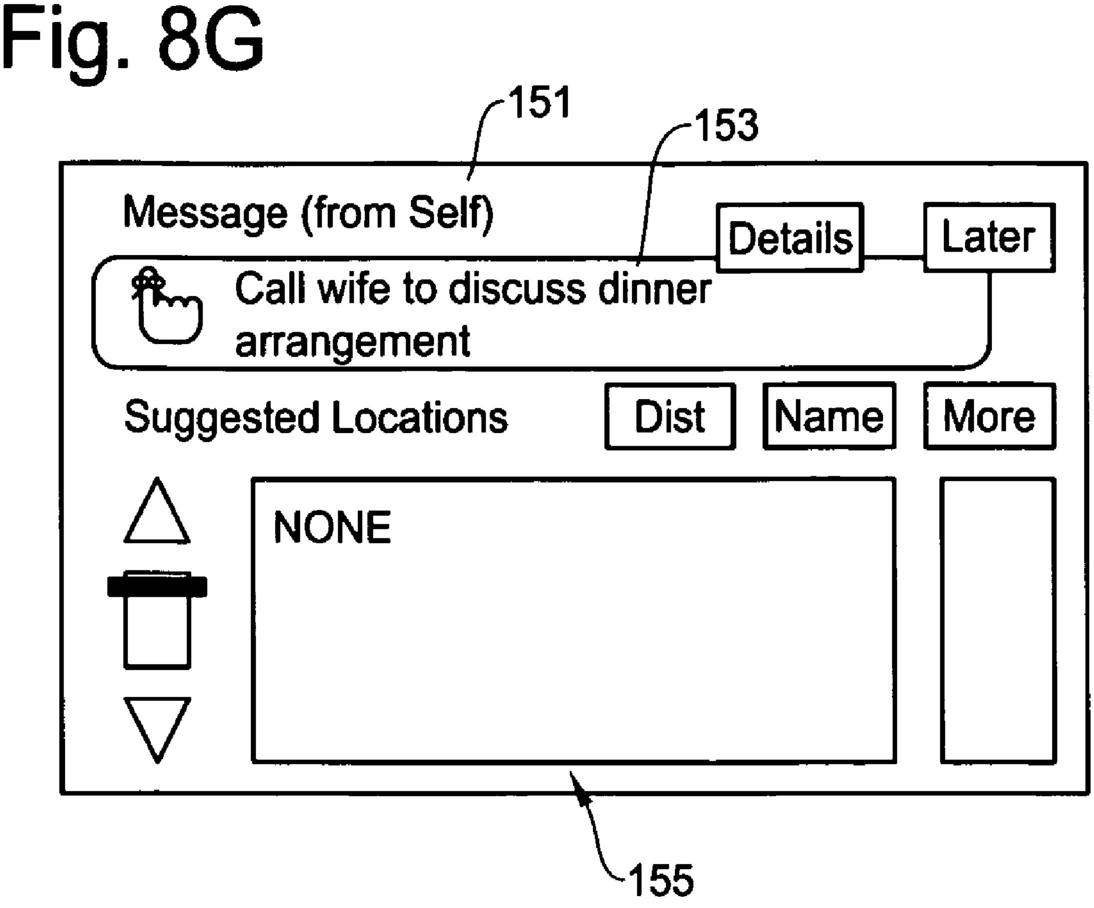

FIGS. 8F and 8G show display examples involved in the case 6 where the message origin indicator 151 shows that the message has been sent by the user himself. FIG. 8F shows the situation where the expected time of arrival is between 6:00 PM and 7:00 PM. In this case, the message content 153 displays "Call ahead and pick up a pepperoni pizza" and a particular pizza store is shown in the suggested location list 155. FIG. 8G shows another situation where the expected time of arrival is after 7:00 PM. In this case, the message content 153 displays "Call wife to discuss dinner arrangement" and no suggested location will be shown on the suggested location list 155. As described above, the location based reminder in the present invention can be used for a variety of situations.

FIG. 9 is a functional block diagram showing an example of basic structure of the apparatus of the present invention for issuing a location based reminder for a navigation system. The structure of FIG. 9 is applicable to any electronic device having a navigation function which enables the electronic device to guide the user to a particular location as noted above. The apparatus of the present invention includes a monitor (display) 250 for graphical user interface, and a controller (CPU) 239 for controlling an overall operation of the apparatus.

The block diagram of FIG. 9 further includes a data storage medium 231 such as a DVD, a hard disc, nonvolatile memory device or any other storage means for storing map data, a map memory 234 for storing a required portion of the map data retrieved from the data storage medium 231, an input device 237 such as a joystick, a remote controller, a touch screen or other input device for the user to select menus, change directions, scroll the screen, change the location of the cursor on the screen, etc., a position measuring device 233 for detecting a current position of the user or vehicle, a buffer memory 248 for storing data concerning the operation of the navigation system and data for generating the location based reminder, and a data transceiver 249 for wireless communication with a remote server.

In FIG. 9, the apparatus for location based reminder under the present invention is able to retrieve the map data from the data storage medium 231 and the map memory 234. Based on the retrieved map data, the apparatus displays the map image or other images on the monitor 250 related to the operation of the navigation function. The CPU 239 controls an overall operation of the apparatus including the location based reminder method. The CPU 239 checks the condition for issuing a location based reminder, and if the condition is met as specified in the reminder message data, it will generate the reminder message in the manner described above. For determining whether to generate the location based reminder, the CPU 239 repeatedly checks the current vehicle position by means of the position measuring device 233 and the validation rules in the reminder message data.

The CPU 239 performs the operation described in detail with reference to the flow charts of FIG. 4 and FIGS. 7A-7C. Thus, the CPU 239 determines whether a reference location is close enough to a primary (assigned) location and other conditions such as time, weather, traffic condition, etc. The input device 237 can be used to input necessary data for creating the reminder message data and storing the data in the navigation system. The data transceiver 249 may be used to accept location based reminder message data from a peripheral device or through a network communication such as an internet. The reminder message data may be stored in the buffer memory 248 for high speed data processing by the CPU 239. The display 250 shows the display examples such as shown in FIGS. 1A to 1D to inform a user about the location based reminder.

FIG. 10 shows an example of structure of a vehicle navigation system for implementing the present invention. While the vehicle navigation system is explained for an illustration purpose, the present invention can also be applied to other types of navigation system, such as a portable navigation device, a PDA (personal digital assistant) device implementing a GPS navigation function, other hand-held devices such as a wireless telephone, or a laptop computer having a GPS navigation function.

In the block diagram, the navigation system includes a data storage medium 231 such as a hard disc, CD-ROM, DVD, nonvolatile memory device or any other storage means for storing the map data and other relevant data used for the navigation system. The navigation system includes a control unit 232 for controlling an operation for reading the information from the data storage medium 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals, and etc.

The block diagram of FIG. 10 further includes a map information memory 234 for storing the map information which is read from the data storage medium 231, a database memory 235 for storing database information such as point of interest (POI) information which is read out from the data storage medium 231, a remote controller (input device) 237 for executing a menu selection operation, an enlarge/reduce operation, a destination input operation, etc. and a remote controller interface 238. Although a remote controller is a typical example for selecting menus, executing selected functions and etc., the navigation system includes various other input devices to achieve the same and similar operations done through the remote controller.

In FIG. 10, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a calculated guidance route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a data transceiver 249 for receiving data through a wireless communication to retrieve data from a remote server, etc. The data transceiver 249 may also be a physical digital card slot that receives data from an inserted digital memory card. The navigation system further includes a buffer memory 248 for temporally storing data for ease of data processing, and a monitor (display) 250 for a graphic user interface.

A program to perform the operation described with reference to the flow charts in FIGS. 4, 7A, 7B, and 7C may be stored in the ROM 240 or the data storage medium 231 or other memory and is executed by the CPU 239. The data transceiver 249 is used to receive the reminder message data created in a manner shown in FIGS. 5 and 6 through a remote server, cellular phone or other devices.

Figure 11:
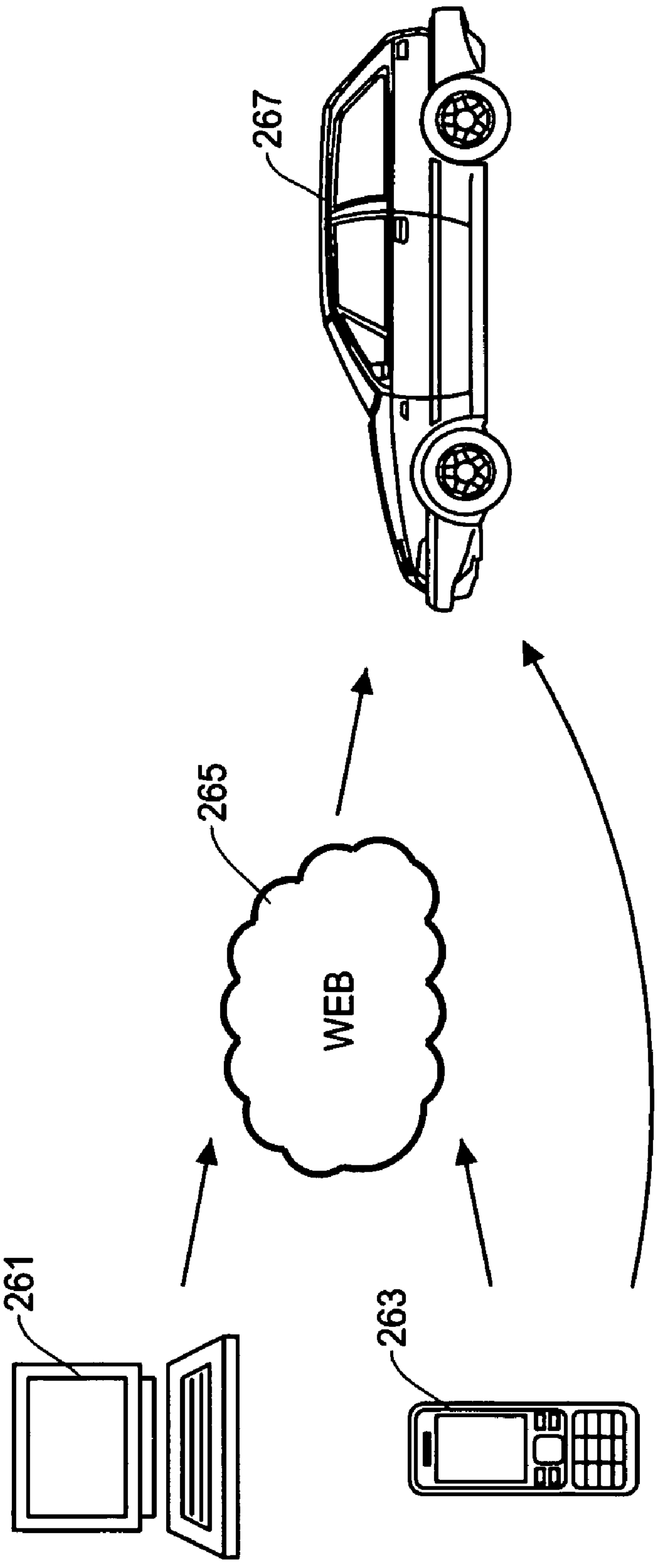
FIG. 11 is a schematic diagram showing an example of overall configuration including a navigation system having the location based reminder capability and a computer and peripheral devices and communication devices for implementing the present invention.

FIG. 11 is a schematic diagram showing an overall system for implementing the present invention including a navigation system having the location based reminder capability and a computer and other devices that can communicate with the navigation system. In the example of FIG. 11, the navigation system 267 is installed in a vehicle. The user may directly operate the navigation system 267 in the vehicle to set the reminder message data including the activation rules for the operation of the present invention.

Alternatively, the user may set the reminder message data through a personal computer 261, which is connected to the internet (web) 265 or any other network to transmit the necessary data for operation of the location based reminder to the navigation system 267. Other devices may be used to set the location based reminder data as well, for instance, a cellular phone 263 may be used for this purpose. The reminder message data may be transmitted via the internet 265 or by a wireless communication between the cellular phone 263 and the navigation system 267 such as by bluetooth connection. Other devices, such as a portable memory device or a personal digital assistance ("PDA") device, may also be used to set the reminder message data as well.

As has been described above, according to the present invention, the navigation system stores the reminder message data for generating the location based reminder by the navigation system. The reminder message data include the message content, primary location, secondary location, effective time, validation rule, etc., created by the user or persons or organizations associated with the user. When the condition associated with the primary location such as a current vehicle position is satisfied in applying the validation rule, the navigation system generates the reminder message on the display which is typically accompanied by a voice message as well.

The reminder message includes one or more secondary location at which the user is able to conduct the activity defined by the reminder message. The user is able to set the secondary location as one of the destination for the route guidance operation by the navigation system so that the user can reach the secondary location correctly and quickly. The reminder message data may be set directly by a navigation system or indirectly via various other external devices and transferred to the navigation system via wired or wireless communication, or inserting a memory card, etc. By the process and configurations described above, the present invention is able to provide useful and enjoyable functions to the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of generating a location based reminder by a navigation system, comprising the following steps of:

creating reminder message data which include a reminder message, a primary location, a secondary location defines a Point Of Interest (POI) type, and a validation rule where the primary location is a location associated with the reminder message, a secondary location is a location where a user conducts an activity defined by the reminder message, and the validation rule defines condition for generating the reminder message;

comparing a reference location with the primary location where the reference location is a destination that is specified by the user for a route guidance operation of the navigation system;

applying the validation rule in the reminder message data to determine whether a relationship between the primary location and the reference location satisfies the condition in the validation rule for generating the reminder message;

displaying the reminder message associated with the primary location when the condition defined in the validation rule is satisfied where the display includes one or more candidate secondary locations determined by the navigation system based on the POI type and within a predetermined distance from the reference location; and conducting a route guidance operation to reach a location selected from the one or more candidate secondary locations by the user.

2. A method of generating a location based reminder as defined in claim 1, further comprising a step of accepting a user's selection of one of the one or more candidate secondary locations for the route guidance operation.

3. A method of generating a location based reminder as defined in claim 1, wherein said reminder message data further include data related to an effective time which specifies a time range or a time limit for generating the reminder message which will be evaluated in combination with the validation rule.

4. A method of generating a location based reminder as defined in claim 3, further comprising a step of determining whether the effective time has been met before displaying the reminder message associated with the primary location.

5. A method of generating a location based reminder as defined in claim 1, wherein when said secondary location in the reminder message data defines a POI type, the navigation system searches and displays the one or more candidate secondary locations belonging to the POI type when displaying the reminder message.

6. A method of generating a location based reminder as defined in claim 5, wherein said candidate secondary locations belonging to the POI type will be displayed in an order of distance from the reference location or in an order of alphabet when displaying the reminder message.

7. A method of generating a location based reminder as defined in claim 3, wherein said reminder message data include two or more different effective times for generating the reminder message and two or more different conditions in the validation rule for triggering a reminder operation so that the reminder message will be generated depending on the different times and conditions.

8. A method of generating a location based reminder as defined in claim 1, further comprising a step of generating the reminder message by voice sounds.

9. A method of generating a location based reminder as defined in claim 1, wherein said step of conducting a route guidance operation includes a step of selecting a candidate secondary location as a destination (final destination) or a waypoint (intermediate destination) for the route guidance operation by the navigation system.

10. A method of generating a location based reminder as defined in claim 1, wherein said step of creating the reminder message data includes a step of directly inputting the reminder message data by operating the navigation system or indirectly inputting the reminder message data by a personal computer and transferring the reminder message data to the navigation system.

11. An apparatus of generating a location based reminder by a navigation system, comprising:

means for creating reminder message data which include a reminder message, a primary location, a secondary location defines a Point Of Interest (POI) type, and a validation rule where the primary location is a location associated with the reminder message, a secondary location is a location where a user conducts an activity defined by the reminder message, and the validation rule defines condition for generating the reminder message;

means for comparing a reference location with the primary location where the reference location is a destination that is specified by the user for a route guidance operation of the navigation system;

means for applying the validation rule in the reminder message data to determine whether a relationship between the primary location and the reference location satisfies the condition in the validation rule for generating the reminder message;

means for displaying the reminder message associated with the primary location when the condition defined in the validation rule is satisfied where the display includes one or more candidate secondary locations determined by the navigation system based on the POI type and within a predetermined distance from the reference location; and means for conducting a route guidance operation to reach a location selected from the one or more candidate secondary locations by the user.

12. An apparatus of generating a location based reminder as defined in claim 11, further comprising means for accepting a user's selection of one of the one or more candidate secondary locations for the route guidance operation.

13. An apparatus of generating a location based reminder as defined in claim 11, wherein said reminder message data further include data related to an effective time which specifies a time range or a time limit for generating the reminder message which will be evaluated in combination with the validation rule.

14. An apparatus of generating a location based reminder as defined in claim 13, further comprising means for determining whether the effective time has been met before displaying the reminder message associated with the primary location.

15. An apparatus of generating a location based reminder as defined in claim 11, wherein when said secondary location in the reminder message data defines a POI type, the navigation system searches and displays the one or more candidate secondary locations belonging to the POI type when displaying the reminder message.

16. An apparatus of generating a location based reminder as defined in claim 15, wherein said candidate secondary locations belonging to the POI type will be displayed in an order of distance from the reference location or in an order of alphabet when displaying the reminder message.

17. An apparatus of generating a location based reminder as defined in claim 13, wherein said reminder message data include two or more different effective times for generating the reminder message and two or more different conditions in the validation rule for triggering a reminder operation so that the reminder message will be generated depending on the different times and conditions.

18. An apparatus of generating a location based reminder as defined in claim 11, further comprising means for generating the reminder message by voice sounds.

19. An apparatus of generating a location based reminder as defined in claim 11, where said means for conducting a route guidance operation includes means for selecting a candidate secondary location as a destination (final destination) or a waypoint (intermediate destination) for the route guidance operation by the navigation system.

20. An apparatus of generating a location based reminder as defined in claim 11, where said means for creating the reminder message data includes means for directly inputting the reminder message data by operating the navigation system or indirectly inputting the reminder message data by a personal computer and transferring the reminder message data to the navigation system.

* * * * *